United States Patent
Sugio et al.

(10) Patent No.: US 10,815,849 B2
(45) Date of Patent: *Oct. 27, 2020

(54) OIL SEPARATOR

(71) Applicant: NABTESCO AUTOMOTIVE CORPORATION, Tokyo (JP)

(72) Inventors: Takuya Sugio, Tokyo (JP); Ichiro Minato, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,475

(22) Filed: Jan. 4, 2018

(65) Prior Publication Data
US 2018/0142591 A1 May 24, 2018

Related U.S. Application Data

(63) Continuation of application No. 14/399,485, filed as application No. PCT/JP2013/063028 on May 9, 2013, now Pat. No. 9,890,675.

(30) Foreign Application Priority Data

May 10, 2012 (JP) .................................. 2012-108842
Jul. 2, 2012 (JP) .................................. 2012-148646
(Continued)

(51) Int. Cl.
*B01D 50/00* (2006.01)
*F01N 3/037* (2006.01)
(Continued)

(52) U.S. Cl.
CPC ............. *F01N 3/037* (2013.01); *B01D 45/08* (2013.01); *B01D 46/0031* (2013.01);
(Continued)

(58) Field of Classification Search
CPC .......................... B01D 45/08; B01D 46/0086; B01D 46/0005; B01D 46/0031; F01P 3/20;
(Continued)

(56) References Cited

U.S. PATENT DOCUMENTS 1,621,026 A  3/1927  Pukerud
2,082,863 A  6/1937  Weisgerber
(Continued)

FOREIGN PATENT DOCUMENTS

CN  2264687 Y  10/1997
CN  1167050 A  12/1997
(Continued)

OTHER PUBLICATIONS

U.S. Office Action dated Apr. 3, 2018 for U.S. Appl. No. 15/360,406 (27 pages).

*Primary Examiner* — Dung H Bui
(74) *Attorney, Agent, or Firm* — Christensen, Fonder, Dardi & Herbert PLLC

(57) ABSTRACT

An oil separator includes a casing that has an inlet for air and an outlet for air, and an impingement member that is provided inside the casing. Air that contains oil is introduced through the inlet into the casing and caused to strike the impingement member so that the oil is separated from the introduced air and is recovered. The outlet opens in the horizontal direction of the casing. The oil separator further includes an L-shaped elbow member that is attached to the outlet. The elbow member protrudes in the horizontal direction from the outlet and is bent upward.

19 Claims, 21 Drawing Sheets

(30) Foreign Application Priority Data

| Oct. 31, 2012 | (JP) | 2012-241233 |
| Oct. 31, 2012 | (JP) | 2012-241234 |
| May 8, 2013 | (JP) | 2013-098863 |
| May 8, 2013 | (JP) | 2013-098864 |

(51) Int. Cl.

| B01D 45/08 | (2006.01) |
| B01D 46/00 | (2006.01) |
| F04B 39/04 | (2006.01) |
| F01M 11/08 | (2006.01) |
| F01M 13/04 | (2006.01) |
| F01M 13/00 | (2006.01) |
| A47L 9/16 | (2006.01) |

(52) U.S. Cl.
CPC ............ *F04B 39/04* (2013.01); *A47L 9/1625* (2013.01); *A47L 9/1641* (2013.01); *A47L 9/1683* (2013.01); *B01D 46/0086* (2013.01); *F01M 11/08* (2013.01); *F01M 2013/0072* (2013.01); *F01M 2013/045* (2013.01); *F01M 2013/0433* (2013.01); *F01M 2013/0461* (2013.01)

(58) Field of Classification Search
CPC ...... F01N 3/0835; F01N 3/037; B60T 17/004; F04B 39/04; F04B 39/16; F04B 39/0284; B60G 2500/02; B60G 17/00; F24F 11/39; F24F 3/1603; F24F 11/30; A47L 9/1683; A47L 9/1641; A47L 9/1625; F01M 2013/0072; F01M 2013/045; F01M 2013/0461; F01M 2013/0433; F01M 11/08
See application file for complete search history.

(56) References Cited

U.S. PATENT DOCUMENTS

| 2,756,837 | A | 7/1956 | Lovelady et al. |
| 2,776,054 | A | 1/1957 | Hirshstein |
| 2,942,691 | A | 6/1960 | Dillon |
| 2,996,233 | A | 8/1961 | Craig et al. |
| 3,000,467 | A | 9/1961 | Bowers |
| 3,075,336 | A | 1/1963 | Hays |
| 3,201,924 | A | 8/1965 | Fulford et al. |
| 3,432,991 | A | 3/1969 | Sauder et al. |
| 4,136,009 | A | 1/1979 | Samiran |
| 4,167,164 | A | 9/1979 | Bachmann |
| 4,226,726 | A | 10/1980 | Rehm |
| 4,298,465 | A | 11/1981 | Druffel |
| 4,299,305 | A * | 11/1981 | Eriksson ............ F01N 1/082 |
| | | | 181/230 |
| 4,534,861 | A | 8/1985 | Wedemeyer et al. |
| 4,541,933 | A | 9/1985 | Armold et al. |
| 4,627,406 | A | 12/1986 | Namiki et al. |
| 4,668,256 | A | 5/1987 | Billiet et al. |
| 4,878,923 | A | 11/1989 | Muller |
| 4,892,569 | A | 1/1990 | Kojima |
| 5,024,203 | A | 6/1991 | Hill |
| 5,145,497 | A | 9/1992 | Maeda |
| 5,171,130 | A | 12/1992 | Kume et al. |
| 5,595,588 | A | 1/1997 | Blevins |
| 6,000,383 | A | 12/1999 | Diotte et al. |
| 6,058,917 | A | 5/2000 | Knowles |
| 6,120,107 | A | 9/2000 | Eslinger |
| 6,186,128 | B1 | 2/2001 | Diotte et al. |
| 6,302,933 | B1 | 10/2001 | Krause et al. |
| 6,626,163 | B1 | 9/2003 | Busen et al. |
| 7,857,882 | B1 | 12/2010 | Johnson |
| 7,913,718 | B1 * | 3/2011 | Cornwall ............ F16L 9/21 |
| | | | 138/112 |
| 8,540,809 | B2 | 9/2013 | Minato et al. |
| 9,017,460 | B2 | 4/2015 | Minato et al. |
| 9,533,246 | B2 | 1/2017 | Sugio et al. |
| 2002/0129586 | A1 | 9/2002 | Tanaka |
| 2003/0074870 | A1 | 4/2003 | Virgilio |
| 2003/0110949 | A1 | 6/2003 | Fornof et al. |
| 2003/0172632 | A1 | 9/2003 | Matsubara et al. |
| 2004/0040273 | A1 | 3/2004 | Lewin |
| 2004/0094036 | A1 | 5/2004 | Nichols et al. |
| 2004/0238452 | A1 | 12/2004 | Moore |
| 2005/0092180 | A1 | 5/2005 | Fornof et al. |
| 2005/0188848 | A1 | 9/2005 | Salzman et al. |
| 2006/0005801 | A1 * | 1/2006 | Nishizawa ............ F02M 35/022 |
| | | | 123/198 E |
| 2006/0090737 | A1 | 5/2006 | Pietschner |
| 2006/0130654 | A1 | 6/2006 | King et al. |
| 2006/0248921 | A1 | 11/2006 | Hosford et al. |
| 2006/0254566 | A1 | 11/2006 | Yasuhara |
| 2007/0175186 | A1 | 8/2007 | Braziunas |
| 2007/0181472 | A1 | 8/2007 | Dawes et al. |
| 2007/0215128 | A1 | 9/2007 | Yonebayashi et al. |
| 2008/0011550 | A1 | 1/2008 | Dunn et al. |
| 2008/0105125 | A1 | 5/2008 | Lauson et al. |
| 2009/0056292 | A1 | 3/2009 | Fornof et al. |
| 2009/0071188 | A1 | 3/2009 | Kusada et al. |
| 2009/0193770 | A1 | 8/2009 | Holzmann et al. |
| 2009/0250044 | A1 | 10/2009 | Braun et al. |
| 2010/0006075 | A1 | 1/2010 | Ruppel et al. |
| 2010/0095702 | A1 | 4/2010 | Nomura et al. |
| 2010/0095922 | A1 | 4/2010 | Nakajima |
| 2010/0178236 | A1 | 7/2010 | Rameshni et al. |
| 2010/0218682 | A1 | 9/2010 | Hammerschick |
| 2010/0229510 | A1 | 9/2010 | Heinen et al. |
| 2010/0269460 | A1 | 10/2010 | Saito et al. |
| 2011/0088641 | A1 | 4/2011 | Shudo et al. |
| 2011/0113738 | A1 | 5/2011 | Zachos |
| 2011/0179755 | A1 | 7/2011 | Gruhler et al. |
| 2011/0308393 | A1 | 12/2011 | Minato et al. |
| 2012/0060452 | A1 | 3/2012 | Sikkenga et al. |
| 2012/0174537 | A1 | 7/2012 | Törnblom et al. |
| 2012/0180442 | A1 | 7/2012 | Siber et al. |
| 2012/0186451 | A1 | 7/2012 | Duesel, Jr. et al. |
| 2012/0255330 | A1 * | 10/2012 | Wanweerakul ........ D06F 39/083 |
| | | | 68/208 |
| 2013/0167719 | A1 | 7/2013 | Alper |
| 2014/0345461 | A1 | 11/2014 | Sikkenga et al. |
| 2016/0008741 | A1 | 1/2016 | Beg et al. |

FOREIGN PATENT DOCUMENTS

| CN | 1248480 | | 3/2000 |
| CN | 1625649 | | 6/2005 |
| CN | 2822750 | Y | 10/2006 |
| CN | 101105356 | | 1/2008 |
| CN | 1874920 | A | 12/2008 |
| CN | 201221882 | Y | 4/2009 |
| CN | 101725388 | A | 6/2010 |
| CN | 201787779 | U | 4/2011 |
| CN | 102317585 | A | 1/2012 |
| DE | 742669 | C | 5/1943 |
| DE | 102004016742 | B3 | 9/2005 |
| DE | 102006008516 | A1 | 8/2007 |
| DE | 102011002582 | A1 | 9/2011 |
| EP | 0 654 605 | A1 | 5/1995 |
| EP | 0 846 485 | A1 | 6/1998 |
| EP | 1 525 376 | A1 | 4/2005 |
| GB | 2 033 247 | A | 5/1980 |
| JP | S47-29633 | Y | 8/1972 |
| JP | S52-013336 | U | 1/1977 |
| JP | S52-65381 | | 5/1977 |
| JP | S52-155279 | U | 11/1977 |
| JP | S53-122007 | A | 10/1978 |
| JP | S55-126919 | U | 9/1980 |
| JP | S56-064997 | A | 6/1981 |
| JP | S56-163918 | | 12/1981 |
| JP | S57-181913 | | 11/1982 |
| JP | 58-064812 | U1 | 5/1983 |
| JP | S 58-137421 | U | 9/1983 |
| JP | S58-192123 | U | 12/1983 |
| JP | S59-109284 | A | 6/1984 |

(56) References Cited

FOREIGN PATENT DOCUMENTS

| | | |
|---|---|---|
| JP | S60-80615 A | 5/1985 |
| JP | S60-84714 U | 6/1985 |
| JP | S62-71322 U | 5/1987 |
| JP | S62-99313 U | 6/1987 |
| JP | S62-179014 U | 11/1987 |
| JP | 01-084725 U1 | 6/1989 |
| JP | 01-114025 U1 | 8/1989 |
| JP | H1-242119 A | 9/1989 |
| JP | H01-156729 U | 10/1989 |
| JP | 02-048125 U1 | 4/1990 |
| JP | H2-106526 U | 8/1990 |
| JP | 02-133419 U1 | 11/1990 |
| JP | H2-147212 U | 12/1990 |
| JP | H03-30813 A | 2/1991 |
| JP | 3-59416 U | 6/1991 |
| JP | H03164584 A | 7/1991 |
| JP | H3-115028 U | 11/1991 |
| JP | H03-246149 A | 11/1991 |
| JP | 4-27780 A | 1/1992 |
| JP | H4-53174 U | 5/1992 |
| JP | H4-59321 U | 5/1992 |
| JP | H04-70970 U | 6/1992 |
| JP | 04-078481 U1 | 7/1992 |
| JP | H4-110118 U | 9/1992 |
| JP | H05-037628 U | 5/1993 |
| JP | H5-83382 U | 11/1993 |
| JP | H05-296173 A | 11/1993 |
| JP | H06-330720 A | 11/1994 |
| JP | H06-346855 A | 12/1994 |
| JP | 07-004880 U | 1/1995 |
| JP | H07-10514 U | 2/1995 |
| JP | H7-8020 Y2 | 3/1995 |
| JP | H07-013418 U | 3/1995 |
| JP | 7-197886 A | 8/1995 |
| JP | H07-227514 A | 8/1995 |
| JP | H07-243318 A | 9/1995 |
| JP | H7-269326 A | 10/1995 |
| JP | H7-332810 A | 12/1995 |
| JP | H08-173740 A | 7/1996 |
| JP | H08-233415 A | 9/1996 |
| JP | H8-290027 A | 11/1996 |
| JP | H9-177532 A | 7/1997 |
| JP | H10-176667 A | 6/1998 |
| JP | H10-211407 A | 8/1998 |
| JP | 10-296038 A | 11/1998 |
| JP | H10-323529 A | 12/1998 |
| JP | H11-108474 A | 4/1999 |
| JP | S63-157234 U | 4/1999 |
| JP | H11-510757 A | 9/1999 |
| JP | 2000-045749 A | 2/2000 |
| JP | 2000-282839 A | 10/2000 |
| JP | 2001-259346 A | 9/2001 |
| JP | 2001-314721 A | 11/2001 |
| JP | 2002-045625 A | 2/2002 |
| JP | 2002-097919 A | 4/2002 |
| JP | 2002-544421 A | 12/2002 |
| JP | 2003-531330 A | 10/2003 |
| JP | 2003322084 A | 11/2003 |
| JP | 2004-232625 A | 8/2004 |
| JP | 2005-066470 A | 3/2005 |
| JP | 2006-075688 A | 3/2006 |
| JP | 2006-075814 A | 3/2006 |
| JP | 2006316641 A | 11/2006 |
| JP | 2007-016664 A | 1/2007 |
| JP | 2007-162248 A | 6/2007 |
| JP | 2007247623 A | 9/2007 |
| JP | 2007255397 A | 10/2007 |
| JP | 2008-002377 A | 1/2008 |
| JP | 2008-202894 A | 9/2008 |
| JP | 2009-008096 A | 1/2009 |
| JP | 2009-109102 A | 5/2009 |
| JP | 2009-114996 A | 5/2009 |
| JP | 2010-017823 A | 1/2010 |
| JP | 2010501788 A | 1/2010 |
| JP | 2010-270743 A | 12/2010 |
| JP | 2011-025205 A | 2/2011 |
| JP | 2011-027331 A | 2/2011 |
| JP | 2011085118 A | 4/2011 |
| JP | 2011-157927 A | 8/2011 |
| WO | WO 88/02658 A1 | 4/1988 |
| WO | WO 01/52973 A1 | 7/2001 |
| WO | WO 01/79664 A1 | 10/2001 |
| WO | WO 2004/013468 A1 | 2/2004 |
| WO | WO 2007/036560 A1 | 4/2007 |
| WO | WO 2008/099845 A1 | 8/2008 |
| WO | WO 2011/099094 A | 8/2011 |

* cited by examiner

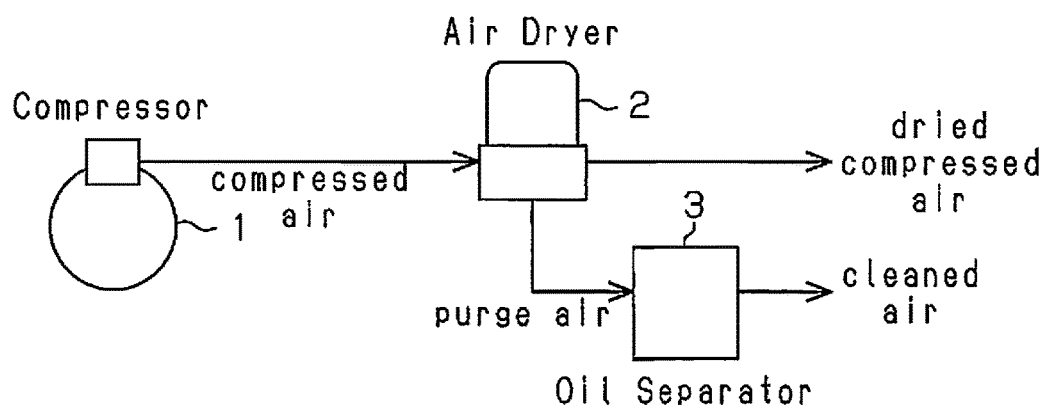
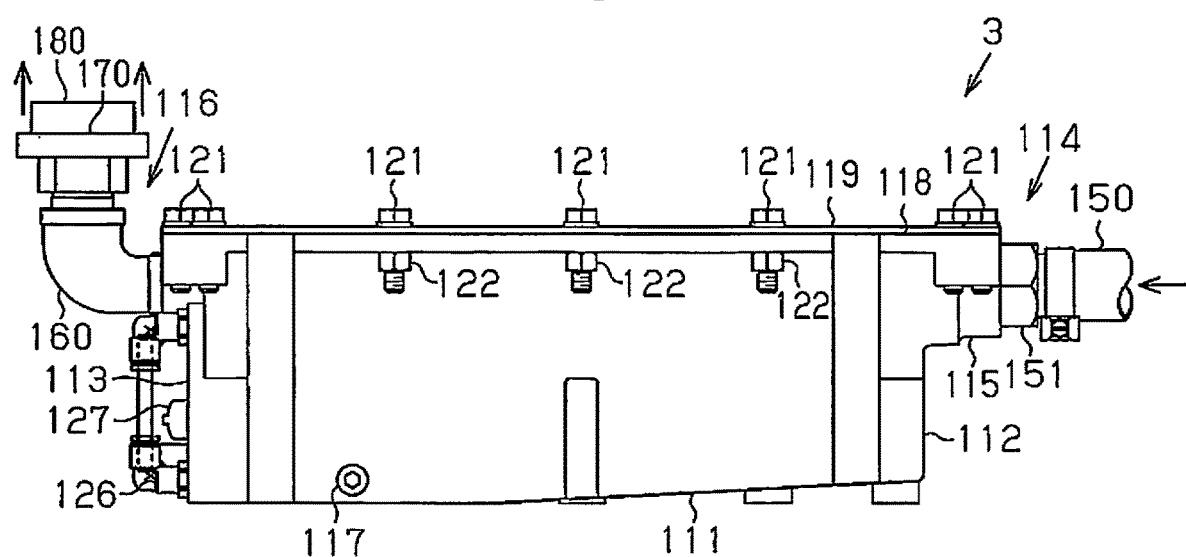

OIL SEPARATOR

RELATED APPLICATIONS

The present application is a continuation of U.S. patent application Ser. No. 14/399,485, filed Nov. 6, 2014, which is a National Phase entry of PCT Application No. PCT/JP2013/063028, filed May 9, 2013, which claims priority from Japanese Patent Application No. 2012-108842, filed May 10, 2012, Japanese Patent Application No. 2012-148646, filed on Jul. 2, 2012, Japanese Patent Application No. 2012-241233, filed on Oct. 31, 2012, Japanese Patent Application No. 2012-241234, filed on Oct. 31, 2012, Japanese Patent Application No. 2013-098863, filed on May 8, 2013, and Japanese Patent Application No. 2013-098864, filed on May 8, 2013, the disclosures of which are hereby incorporated by reference herein in their entirety.

FIELD OF THE INVENTION

The present invention relates to an oil separator that separates oil contained in air that has passed through equipment.

BACKGROUND OF THE INVENTION

Vehicles such as trucks, buses, and construction machines utilize compressed air sent from a compressor, which is directly connected to an engine, to control systems such as brakes and suspensions. The compressed air contains water, which is contained in the atmosphere, and oil for lubricating the inside of the compressor. When the compressed air containing such water and oil enters inside the systems, it causes rust and swelling of rubber members (such as O-rings) and results in an operational defect. Thus, an air dryer is provided downstream of the compressor in an air system for removing water and oil from the compressed air (for example, Patent Document 1).

A filter and a desiccant such as silica gel and zeolite are provided in the air dryer. The air dryer performs dehumidification to remove water from compressed air and regeneration to regenerate the desiccant by removing the water adsorbed by the desiccant and discharging it to the outside.

The air discharged from the air dryer during regeneration of the desiccant contains oil together with water. Considering the burden on the environment, an oil separator may be provided downstream of the compressor in the air system.

An impingement plate-type oil separator performs gas/liquid separation by allowing air that contains water and oil to strike impingement plates provided in the housing to recover the oil from the air and discharge cleaned air (for example, Patent Document 2).

PRIOR ART DOCUMENTS

Patent Documents

Patent Document 1: Japanese Laid-Open Patent Publication No. 10-296038
Patent Document 2: Japanese Laid-Open Patent Publication No. 2008-2377

SUMMARY OF THE INVENTION

Problems that the Invention is to Solve

The above described oil separators are used in a cylinder head to return the separated oil from the bottom of the oil separator to the cylinder head. However, if the oil separator is located downstream of the compressor in the air system, the oil separated from air is stored in the housing of the oil separator. Since the oil separator is mounted on a vehicle, the stored oil can leak from the outlet to the outside due to changes in the travel acceleration of the vehicle or inclination of the vehicle. Thus, an oil separator has been desired that suppresses leakage of oil from the outlet to the outside.

Accordingly, it is an objective of the present invention to provide an oil separator that suppresses leakage of oil from the outlet to the outside.

Means for Solving the Problems

To achieve the foregoing objective and in accordance with a first aspect of the present invention, an oil separator is provide that includes a housing including an inlet for air and an outlet for air, and an impingement member located in the housing. The oil separator introduces air containing oil into the housing through the inlet, and causes the air to strike the impingement member to separate oil from the introduced air, thereby recovering the oil. The outlet opens to face in the horizontal direction of the housing. The oil separator further includes an L-shaped elbow member attached to the outlet. The elbow member extends in the horizontal direction from the outlet and bends upward.

In accordance with another aspect of the present invention, an oil separator is provided that includes a lid including an inlet for introducing purge air from an air dryer and an outlet for discharging cleaned air, a plurality of expansion chambers arranged next to one another in a vertical direction, a housing attachable to the lid, and an attaching and detaching mechanism for allowing the lid to be attached to and detached from the housing. The oil separator causes the purge air to flow into the housing and strike an impingement member to separate oil from the purge air, thereby recovering liquid containing oil, and the oil separator discharges cleaned air. A through hole, which permits the purge air introduced through the inlet to flow vertically downward, is formed between the expansion chambers.

In accordance with a further aspect of the present invention, an oil separator is provided that includes a lid including an inlet for introducing purge air from an air dryer and an outlet for discharging cleaned air, a plurality of expansion chambers arranged next to one another in a vertical direction, a housing attachable to the lid, and an attaching and detaching mechanism for allowing the lid to be attached to and detached from the housing. The oil separator causes the purge air to flow into the housing and strike an impingement member to separate oil from the purge air, thereby recovering liquid containing oil, and the oil separator discharges cleaned air. The oil separator further includes a drain outlet for draining the collected liquid, a drain hose connected to the drain outlet, and a securing member to which a distal end of the drain hose is detachably attached. The securing member closes the distal end of the drain hose at least during unloading operation of the air dryer.

In accordance with a yet further aspect of the present invention, an oil separator is provided that includes a housing including an inlet for air and an outlet for air, an expansion chamber, which is located in the housing and expands air that has been introduced through the inlet, an accommodation member, which is located in the housing and communicates with the expansion chamber in the vertical direction. The accommodation member accommodates an impingement member. The oil separator further includes a communication section that connects the inside of the housing and the outlet to each other and a collected liquid storage portion located below the accommodation member. The oil separator introduces air containing oil from the air dryer into the housing through the inlet, and causes the air to strike the impingement member to separate oil from the introduced air, thereby recovering the oil. The inlet and the outlet are located in an upper section of the housing, and the accommodation member discharges the introduced air sideways.

BRIEF DESCRIPTION OF THE DRAWINGS

FIG. 1 is a block diagram illustrating an installation position of an oil separator according to a first embodiment of the present invention in an air system;

FIG. 2 is a side view illustrating the external structure of the oil separator of FIG. 1;

DETAILED DESCRIPTION OF THE PREFERRED EMBODIMENTS

First Embodiment

Figure 3:
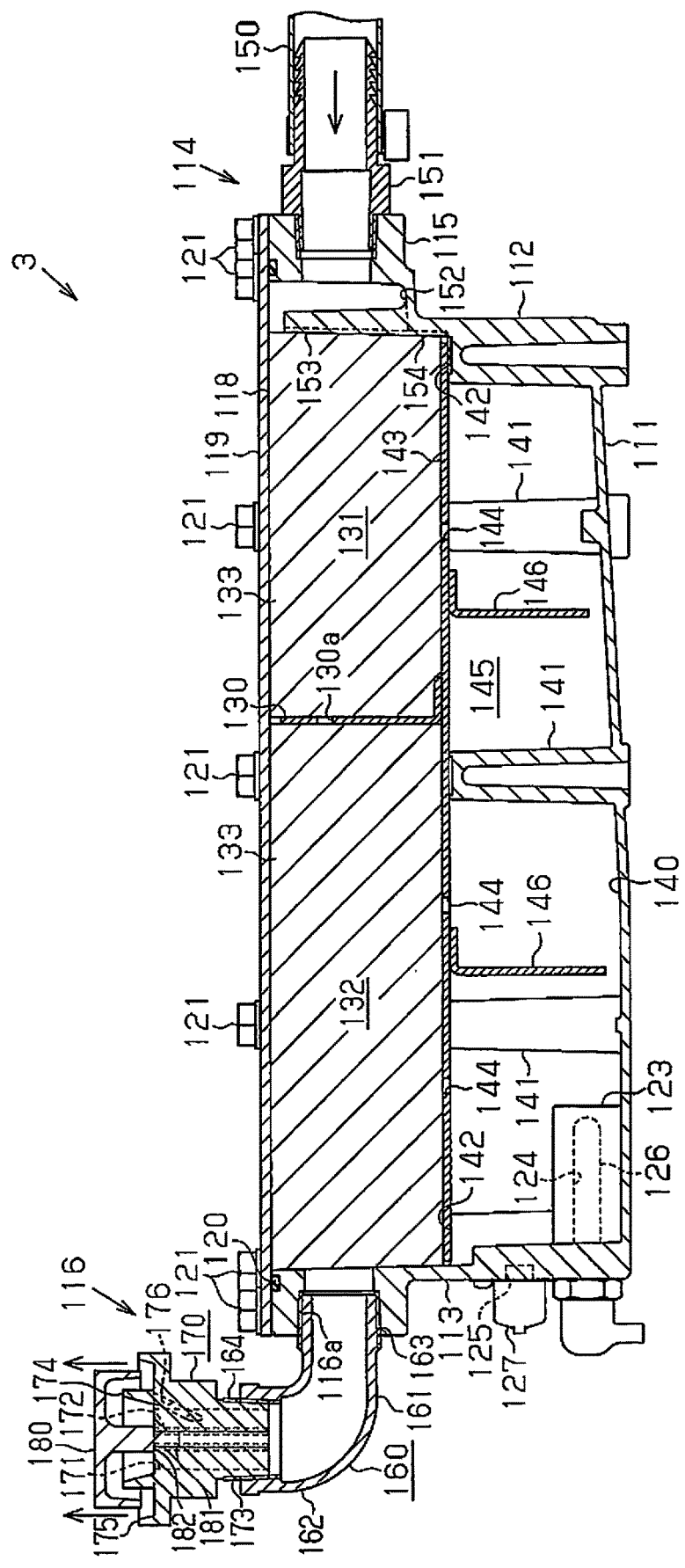
FIG. 3 is a vertical cross-sectional view illustrating the internal structure of the oil separator of FIG. 1.

An oil separator according to a first embodiment will now be described with reference to FIGS. 1 to 5. The oil separator is applied to an exhaust system of an air dryer.

As shown in FIG. 1, vehicles such as trucks, buses, and construction machines utilize compressed air sent from a compressor 1 to control systems such as brakes and suspensions. Thus, an air dryer 2, which removes oil and water in the compressed air and provides dried air, is located downstream of the compressor 1 of an air system. A desiccant is provided in the air dryer 2. The air dryer 2 performs dehumidification to remove oil and water from the compressed air, and regeneration to regenerate the desiccant by removing the oil and water adsorbed by the desiccant and discharging them to the outside.

In the present embodiment, since air (purge air) discharged from the air dryer 2 during regeneration of the desiccant includes oil together with water, an oil separator 3 is provided downstream of the compressor 1 of the air system considering the burden on the environment. In particular, the oil separator 3 is provided in an exhaust system of the air dryer 2, and separates and recovers the oil and water from purge air discharged during regeneration of the desiccant in the air dryer 2.

The oil separator 3 is an impingement plate-type oil separator and includes, inside the housing, impingement members, against which air containing oil and water strikes. The impingement plate-type oil separator 3 performs gas/liquid separation by allowing air containing oil and water to strike the impingement members. In this manner, the oil separator 3 recovers oil from air, and discharges cleaned air. The liquid that has been separated from air contains oil and water. Such liquid will hereafter be referred to as collected liquid in some cases.

As shown in FIG. 2, the oil separator 3 includes a rectangular parallelepiped housing 111, which extends in the horizontal direction. The housing 111 has a front face 112 and a rear face 113, which are opposed to each other in the longitudinal direction. An inlet 114 and an outlet 116 are respectively formed in the front face 112 and the rear face 113. That is, air passes through the oil separator 3 from right to left in FIG. 2.

As shown in FIG. 3, support members (support columns 141, steps 142), which support a liquid communication plate 143, are provided on a bottom face 140 of the housing 111. The liquid communication plate 143 is mounted on the support columns 141 and the steps 142 in a bridging manner in the housing 111. The section in the housing 111 above the liquid communication plate 143 functions as an expansion chamber, which permits air introduced through the inlet 114 to pass through. The section in the housing 111 below the liquid communication plate 143 functions as a collected liquid storage portion 145, which stores oil and water (collected liquid) separated from the air in the expansion chamber. The collected liquid storage portion 145 is capable of storing the collected liquid to the lower surface of the liquid communication plate 143.

A plate-like partition wall 130 is mounted on the upper surface of the liquid communication plate 143 in the middle between the inlet 114 and the outlet 116. An orifice 130a is formed at the upper section of the partition wall 130. The partition wall 130 functions as an orifice with the orifice 130a. The partition wall 130 divides the section in the housing 111 above the liquid communication plate 143 into a primary expansion chamber 131 close to the inlet 114 and a secondary expansion chamber 132 close to the outlet 116 in the horizontal direction. The volume of the secondary expansion chamber 132 is greater than the volume of the primary expansion chamber 131. Thus, the saturated vapor pressure in the secondary expansion chamber 132 is further reduced as compared to that of the primary expansion chamber 131. This causes the oil and the water to easily condense, increasing the mass of particles of the oil and the water and allowing them to easily strike an impingement member. A urethane foam block (such as a sponge block) 133 is arranged in each of the primary expansion chamber 131 and the secondary expansion chamber 132. The air introduced through the inlet 114 strikes the urethane foam blocks 133, which separates oil and water from the air. That is, the urethane foam blocks 133 trap oil and water contained in the air. The urethane foam blocks 133 correspond to the impingement members.

The liquid communication plate 143 has liquid communication holes 144, which allow the oil and water separated in the primary expansion chamber 131 and the secondary expansion chamber 132 to pass through to the collected liquid storage portion 145. At least one of the liquid communication holes 144 is formed corresponding to each of the expansion chambers 131, 132. The oil and water separated from the air by striking the urethane foam blocks 133 flows along the upper surface of the liquid communication plate 143 and drops through any of the liquid communication holes 144 into the collected liquid storage portion 145.

Two baffle plates 146, which restrict the flow of the collected liquid stored in the collected liquid storage portion 145, are mounted on the lower surface of the liquid communication plate 143. The baffle plates 146 extend in the widthwise direction. The baffle plates 146 restrict the collected liquid stored in the collected liquid storage portion 145 from moving due to changes in the vehicle acceleration, thus suppressing splashing of the collected liquid.

Furthermore, an opening portion 118 is formed in the upper surface of the housing 111. The opening portion 118 is closed by a rectangular lid 119. At the top of the opening portion 118, an O-ring 120 is provided along the entire circumference of the opening portion 118. The O-ring 120 is sandwiched between the opening portion 118 and the lid 119. The lid 119 and the housing 111 are tightly secured with bolts 121 and nuts 122. The lid 119 restricts movement of, for example, the urethane foam blocks 133 accommodated in the housing 111.

An accommodation portion 123 for accommodating a heating device, which is a heater 126 in the present embodiment, is provided on a part of the bottom face 140 in the housing 111 close to the outlet 116. In the accommodation portion 123, an insertion section 124 for inserting the heater 126 opens in the rear face 113 of the housing 111. The heater 126 is columnar and is inserted in the accommodation portion 123 from the rear face 113. The heater 126 is connected to a power supply.

A mounting hole 125 for mounting a thermostat 127 is formed in the rear face 113 of the housing 111 above the insertion section 124. The thermostat 127 is mounted in the mounting hole 125 and is connected to the power supply and the heater 126. The thermostat 127 detects the temperature of the collected liquid storage portion 145 and controls heating performance of the heater 126 based on the detected temperature. The water contained in the collected liquid that is stored at the bottom face of the collected liquid storage portion 145 is evaporated as much as possible by heating the collected liquid storage portion 145 with the heaters 126 so that liquid containing high concentration of oil is generated.

An introduction portion 115 is formed in an upper section of the front face 112 of the housing 111. The passage cross-sectional area of the introduction portion 115 is smaller than that of the housing 111. The inlet 114 is formed in the introduction portion 115. A cylindrical mounting member 151 is secured to the distal end of the inlet 114. The distal end of a hose 150, which is connected to the air dryer 2, is connected to the distal end of the mounting member 151. A restricting plate 153, which restricts reverse flow of the collected liquid from the inside of the housing 111 to the inlet 114, is provided in front of the introduction portion 115. The restricting plate 153 extends from an inner bottom face 152 of the introduction portion 115 and stands upright into the introduction portion 115. The inner bottom face 152 is located above the upper surface of the liquid communication plate 143. Thus, a step 154 is provided on the inner end of the introduction portion 115 to form a step with respect to the liquid communication plate 143. The height of the step 154 restricts reverse flow of the collected liquid. Also, the collected liquid splashed by changes in the vehicle acceleration and vibration is restricted from directly entering the inlet 114 by the restricting plate 153.

An L-shaped elbow member 160 is attached to the outlet 116. The elbow member 160 extends in the horizontal direction from the outlet 116 and bends upward. The basal end of the elbow member 160 is screwed to the outlet 116. A cylindrical drip preventing member 170 for preventing drip of liquid is attached to the distal end of the elbow member 160. The basal end of the drip preventing member 170 is screwed to the distal end of the elbow member 160. A cylindrical cover 180 having a closed end and attached to the distal end of the drip preventing member 170 to prevent entry of foreign matter.

Figure 4:
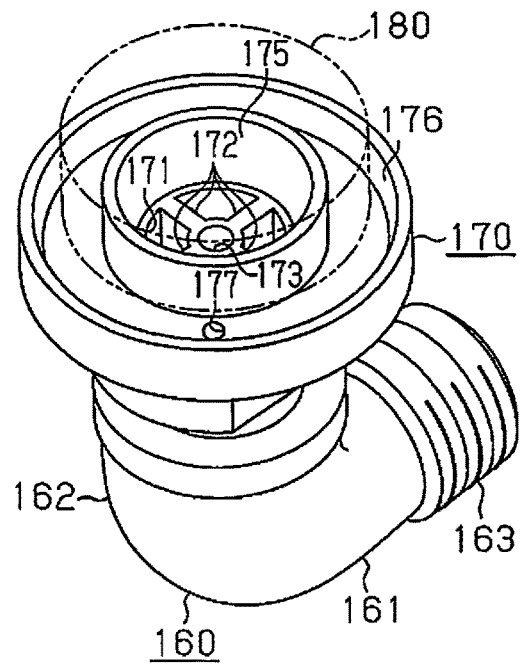
FIG. 4 is a perspective view illustrating the elbow member and the drip preventing member of FIG. 3.
Figure 5:
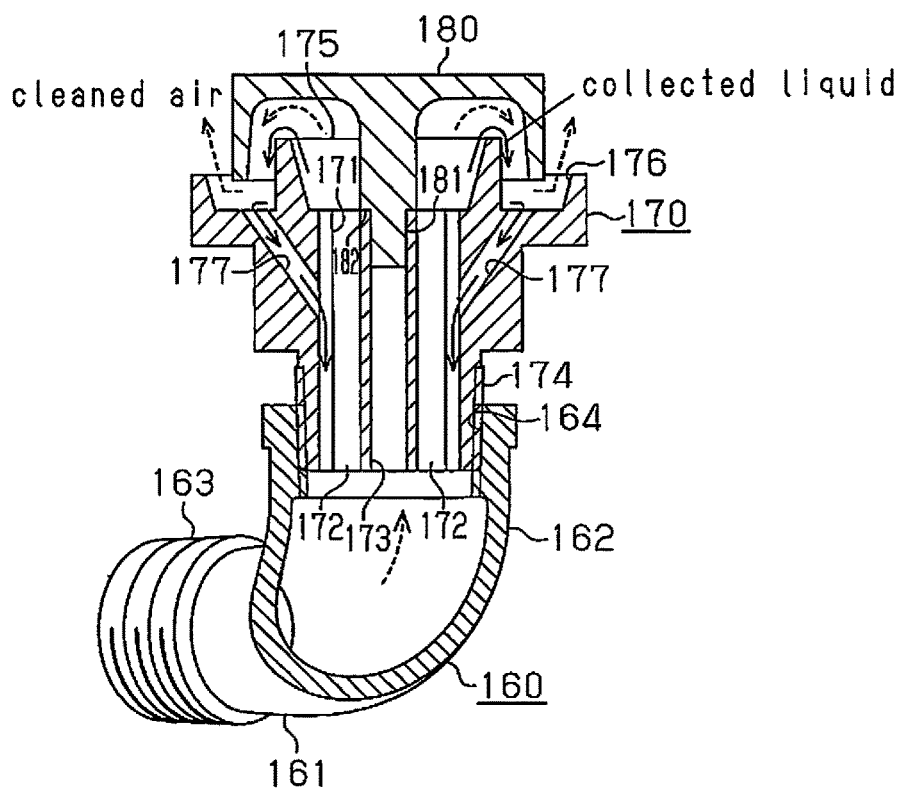
FIG. 5 is a cross-sectional view illustrating the internal structure of the elbow member and the drip preventing member of FIG. 4.

As shown in FIG. 4 and FIG. 5, the elbow member 160 includes a horizontal part 161, which extends in the horizontal direction, and a vertical part 162, which is continuous with the horizontal part 161 and extends in the vertical direction. An external thread portion 163, which is screwed to an internal thread portion 116a of the outlet 116, is formed at the basal end of the elbow member 160. The external thread portion 163 is formed such that, when the external thread portion 163 is screwed to the internal thread portion 116a, tightening between the external thread portion 163 and the internal thread portion 116a stops at a position where the distal end of the elbow member 160 faces upward. An internal thread portion 164, to which the drip preventing member 170 is screwed, is formed at the distal end of the elbow member 160. When the collected liquid flows into the elbow member 160 from the outlet 116, the vertical part 162 prevents the collected liquid from flowing to the outside.

A through hole 171, which connects the basal end and the distal end of the drip preventing member 170, is formed inside the drip preventing member 170. Four division plates 172 are provided in the through hole 171 to prevent large foreign matter, the size of which would block the flow passage, from entering the through hole 171. The division plates 172 are located in the drip preventing member 170 to extend in the axial direction at equal intervals in the circumferential direction. A cylindrical portion 173 is formed at the center of the through hole 171. Each division plate 172 is connected to the cylindrical portion 173. An external thread portion 174, which is screwed to the internal thread portion 164 of the elbow member 160, is formed at the basal end of the drip preventing member 170. An opening portion 175 is formed at the distal end of the drip preventing member 170. A drip pan 176 is formed on the side face of the opening portion 175 along the entire circumference to receive liquid that drips from the opening portion 175. A return bore 177 is formed at the bottom portion of the drip pan 176. The return bore 177 functions as a returning portion that returns the liquid received by the drip pan 176 to the through hole 171. The return bore 177 extends from the drip pan 176 to the through hole 171. Thus, the liquid that has dripped to the drip pan 176 returns to the elbow member 160 through the return bore 177.

A columnar insertion portion 181, which can be inserted into the cylindrical portion 173 of the drip preventing member 170, projects from the inside of the cover 180. The insertion portion 181 has a step 182. The step 182 determines the insertion position of the cover 180 with respect to the drip preventing member 170. When the columnar insertion portion 181 is inserted in the cylindrical portion 173, the cover 180 covers the opening portion 175 of the drip preventing member 170. The outer diameter of the cover 180 is smaller than the inner diameter of the drip pan 176. Thus, the cleaned air that has passed through the drip preventing member 170 is discharged to the outside through the space between the opening portion 175 of the drip preventing member 170 and the inner surface of the cover 180.

Operation of the above described oil separator 3 will now be described.

Purge air discharged from the air dryer 2 is introduced to the oil separator 3. The purge air contains oil and water.

The air introduced into the primary expansion chamber 131 through the inlet 114 flows through the associated urethane foam block 133 while oil and water are trapped by the urethane foam block 133. At this time, the oil and water that has struck the urethane foam block 133 is separated from the air. The liquid containing the water and oil trapped by the urethane foam block 133 moves in the urethane foam block 133, reaches the upper surface of the liquid communication plate 143, drops through the liquid communication holes 144 formed in the liquid communication plate 143 into the collected liquid storage portion 145, and is stored in the collected liquid storage portion 145.

The air that has passed through the urethane foam block 133 in the primary expansion chamber 131 flows toward the orifice 130a of the partition wall 130, and passes through the orifice 130a. At this time, the oil and the water that has struck the partition wall 130 are separated from the air. The liquid that has struck the partition wall 130 and has been separated from the air moves along the partition wall 130, reaches the upper surface of the liquid communication plate 143, drops through the liquid communication holes 144 formed in the liquid communication plate 143 into the collected liquid storage portion 145, and is stored in the collected liquid storage portion 145.

The air that has passed through the orifice 130a of the partition wall 130 passes through the urethane foam block 133 in the secondary expansion chamber 132, while being deprived of oil and water by the associated urethane foam block 133. At this time, the oil and water that has struck the urethane foam block 133 is separated from the air. The liquid containing the water and oil trapped by the urethane foam block 133 moves in the urethane foam block 133, reaches the upper surface of the liquid communication plate 143, drops through the liquid communication holes 144 formed in the liquid communication plate 143 into the collected liquid storage portion 145, and is stored in the collected liquid storage portion 145.

The air that has passed through the urethane foam block 133 of the secondary expansion chamber 132 becomes cleaned air containing no oil and is discharged to the outside from the outlet 116 via the drip preventing member 170 and the cover 180.

The collected liquid stored in the collected liquid storage portion 145 is heated by the heater 126. This evaporates the water in the collected liquid. The collected liquid containing a high concentration of oil is discharged from the drain outlet 117.

Vibration caused during travel of the vehicle is transmitted to the oil separator 3. The oil separator 3 tilts in the same manner as tilting of the vehicle. Thus, the collected liquid stored in the collected liquid storage portion 145 is influenced by the behavior of the vehicle. According to the oil separator 3 of the present embodiment, the step 154 is provided in addition to the restricting plate 153 provided in the introduction portion 115. Thus, if the collected liquid flows from the inside of the housing 111 toward the inlet 114 due to changes in the travel acceleration of the vehicle or inclination of the vehicle, the step 154 and the restricting plate 153 restrict the collected liquid from flowing into the inlet 114. Even if the collected liquid attempts to move in the longitudinal direction of the housing 111 due to changes in the travel acceleration of the vehicle, the baffle plates 146 restrict the movement of the collected liquid. Thus, since the movement of the collected liquid is restricted, changes in the liquid surface of the collected liquid are reduced. This reduces flowing of the collected liquid into the inlet 114 from the inside of the housing 111 and suppresses splashing of the collected liquid due to liquid striking the inner wall of the housing 111. Since the restricting plate 153 is formed only in front of the inlet 114, and the sides are open, the introduction amount of the air is ensured while restricting the collected liquid from flowing into the inlet 114.

The oil separator 3 of the present embodiment further includes the elbow member 160 and the drip preventing member 170 at the outlet 116. Thus, if the collected liquid flows from the inside of the housing 111 into the outlet 116 due to changes in the travel acceleration of the vehicle or inclination of the vehicle, the elbow member 160 retains the liquid, thereby restricting the liquid from leaking to the outside. Further, if the liquid that has flowed through the elbow member 160 drips from the distal end of the drip preventing member 170, the liquid is received by the drip pan 176 and is then returned to the elbow member 160. This restricts the liquid from leaking from the outlet 116.

The above described first embodiment has the following advantages.

(1) The elbow member 160 is attached to the outlet 116, which opens in the horizontal direction. Thus, if the collected liquid containing oil flows from the inside of the housing 111 into the outlet 116 due to changes in the travel acceleration of the vehicle or inclination of the vehicle, the elbow member 160 retains the liquid, thereby restricting the liquid from leaking to the outside from the outlet 116.

(2) The drip preventing member 170 is provided at the distal end of the elbow member 160. Therefore, if liquid that contains oil drips from the distal end of the drip preventing member 170, the liquid is received by the drip pan 176 and is then returned to the elbow member 160. This further restricts the liquid from leaking from the outlet 116.

The above described first embodiment may be modified as follows.

The cover 180 may be omitted if the drip preventing member 170 prevents entry of foreign matter.

The drip preventing member 170 may be omitted if the elbow member 160 sufficiently restricts leakage of collected liquid.

In the first embodiment, the step 154 is provided so that the height of the upper surface of the liquid communication plate 143 and the height of the inner bottom face 152 of the introduction portion 115 are different. However, the step 154 may be omitted.

In the first embodiment, the O-ring 120 is provided between the opening portion 118 of the housing 111 and the lid 119. However, the O-ring 120 may be omitted. It is desirable that the sealing between the opening portion 118 of the housing 111 and the lid 119 be maintained.

In the first embodiment, the lid 119 restricts the movement of the urethane foam blocks 133. However, as long as the urethane foam blocks 133 are secured, the movement does not necessarily have to be restricted by the lid 119.

In the first embodiment, the urethane foam blocks 133 are provided in the primary expansion chamber 131 and the secondary expansion chamber 132. However, the urethane foam blocks 133 may be changed or partially omitted in accordance with the amount of oil and water discharged from the air dryer 2 (the compressor 1).

In the first embodiment, the heater 126 heats the collected liquid storage portion 145. However, the heater 126 may directly heat the collected liquid stored in the collected liquid storage portion 145. In this case, the thermostat 127 is desirably located on the inner wall of the housing 111 to perform accurate temperature control. Since this structure increases the heat transfer from the heater 126 to the collected liquid, the collected liquid is efficiently heated as compared to the case in which the collected liquid is indirectly heated.

The number of heaters 126 may be changed as required.

In the first embodiment, the oil separator 3 is provided in the exhaust system of the air dryer 2, which is downstream of the compressor 1 of the air system. However, the oil separator 3 may be provided downstream of the compressor 1 of the air system and upstream of the air dryer 2. In this case, oil is separated from air containing lubricant for the compressor 1, and cleaned air is supplied to the air dryer 2. Thus, the desiccant in the air dryer 2 is prevented from being deteriorated due to the oil.

Second Embodiment

An oil separator according to a second embodiment will now be described with reference to FIGS. 6 to 10.

Figure 6:
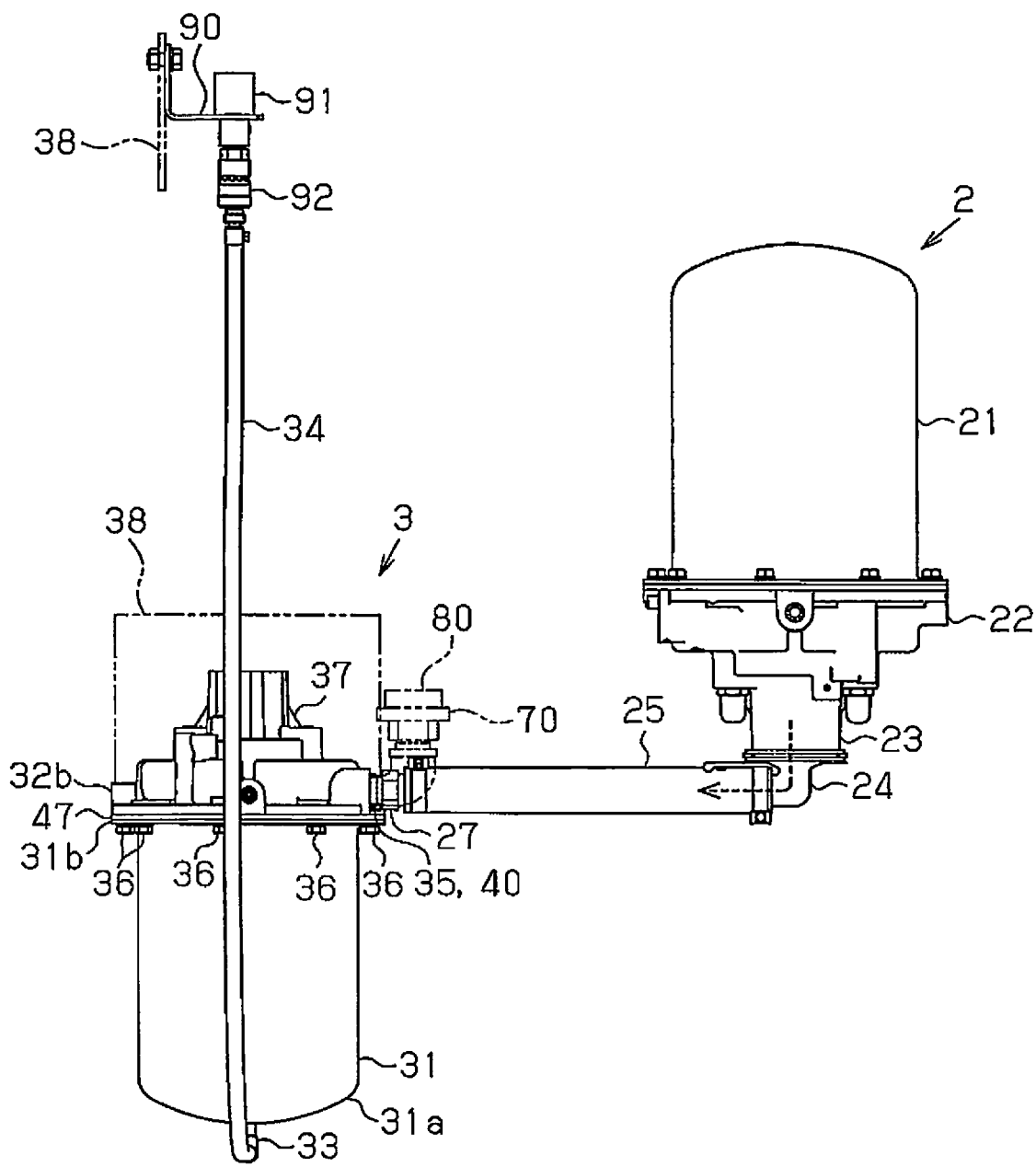
FIG. 6 is a diagram illustrating a mounting state of an oil separator according to a second embodiment of the present invention and a connection state of the oil separator and an air dryer.

As shown in FIG. 6, the air dryer 2 includes a cylindrical case 21 having a vertically upper end closed, and a support member 22, which closes the opening portion of the case 21 and supports the case 21. A purge air outlet 23, which discharges purge air during regeneration of a desiccant, is formed at the lower section of the support member 22. A purge air discharge cover 24, to which a connecting hose 25 is connected, is attached to the purge air outlet 23. The connecting hose 25 is connected to an oil separator 3. An inlet (not shown), which introduces compressed air compressed by the compressor 1, and an outlet (not shown), which discharges dried compressed air, are formed in the support member 22 of the air dryer 2.

The oil separator 3 includes a cylindrical housing having a closed end and extending in the vertical direction, which is a case 31 in this embodiment, and a lid 32, which closes the opening portion of the case 31. A drain outlet 33 for draining the collected liquid that has been stored is provided at a bottom portion 31a of the case 31. A drain hose 34, which is used when removing the collected liquid, is connected to the drain outlet 33. The lid 32 has an inlet 35 for introducing the purge air from the air dryer 2 through the connecting hose 25, and an outlet 40 for discharging cleaned air from which oil has been separated. The inlet 35 and the outlet 40 are formed separately. The inlet 35 and the connecting hose 25 are connected to each other by a coupling member 27.

A mounting member 37 is formed integrally with the lid 32 of the oil separator 3 to extend upright from the lid 32. The mounting member 37 is secured to a chassis 38 with bolts.

The distal end of the drain hose 34 is detachably attached to a support member 90, which is secured to, for example, the chassis 38 of the vehicle. That is, a securing member 91 is secured to the support member 90. A one-touch coupler 92 is secured to the lower end of the securing member 91. The one-touch coupler 92 allows the distal end of the drain hose 34 to be attached to the securing member 91 by a single operation. The drain hose 34 is secured to the securing member 91 by inserting the distal end of the drain hose 34 to the one-touch coupler 92, and is detached from the securing member 91 by manipulating the one-touch coupler 92. The distal end of the drain hose 34 is attached to the securing member 91 such that an opening portion formed in the distal end opens vertically upward.

An elbow member 60, which extends in the horizontal direction and bends vertically upward, is screwed to the outlet 40 of the oil separator 3. A drip preventing member 70 and a cover 80 for preventing entry of foreign matter are attached to the distal end of the elbow member 60.

Figure 7:
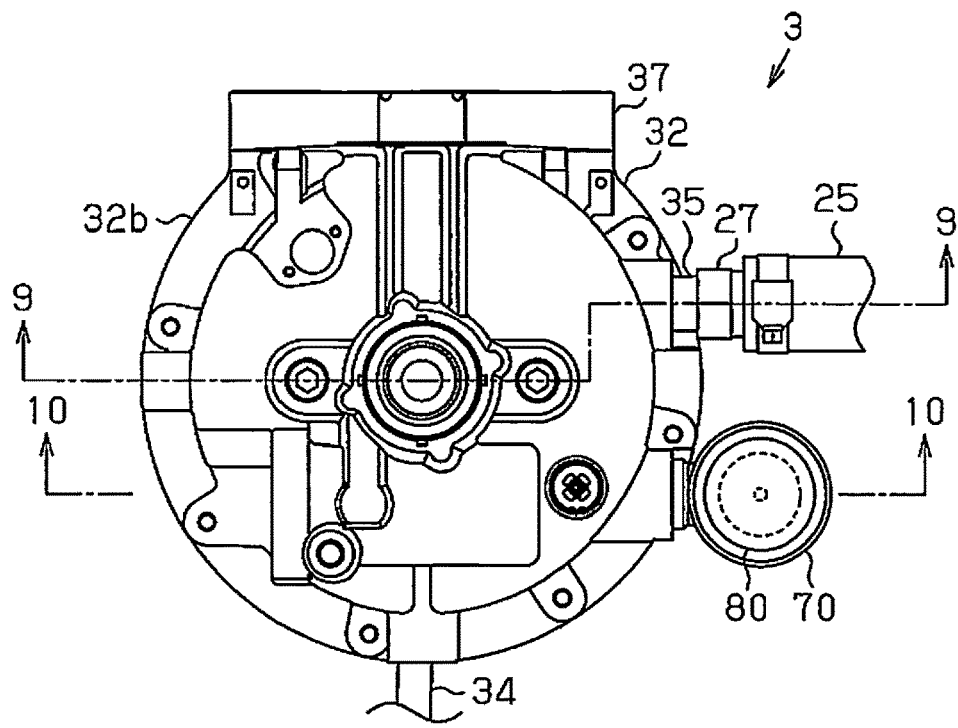
FIG. 7 is a top view illustrating the position of an inlet and an outlet of the oil separator.

As shown in FIG. 7, the lid 32 has the inlet 35 and the outlet 40, which are open in the same direction (rightward in the drawing). The inlet 35 and the outlet 40 are respectively provided on a side that faces in the horizontal direction. The connecting hose 25 is connected to the inlet 35 via the coupling member 27. The elbow member 60 is connected to the outlet 40. That is, the coupling member 27 and the elbow member 60 are arranged next to each other.

Figure 8:
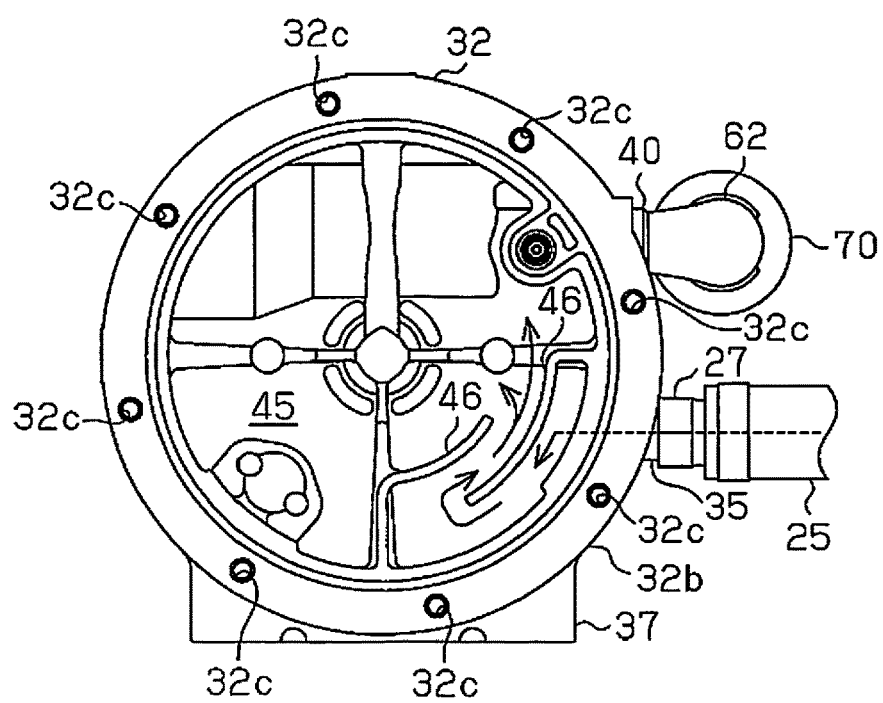
FIG. 8 is a bottom view illustrating the inside of the lid of the oil separator.

As shown in FIG. 8, the lid 32 is a cylinder having a vertically upper end closed. Two baffle plates 46 extend from the inner wall of the lid 32 in the vicinity of the inlet 35 to be perpendicular to the flow direction of the purge air introduced through the inlet 35. The internal space of the lid 32 functions as a first expansion chamber 45, which expands the purge air introduced from the inlet 35. The lid 32 has a communication section 32a, which connects the inside of the case 31 to the outlet 40.

Figure 9:
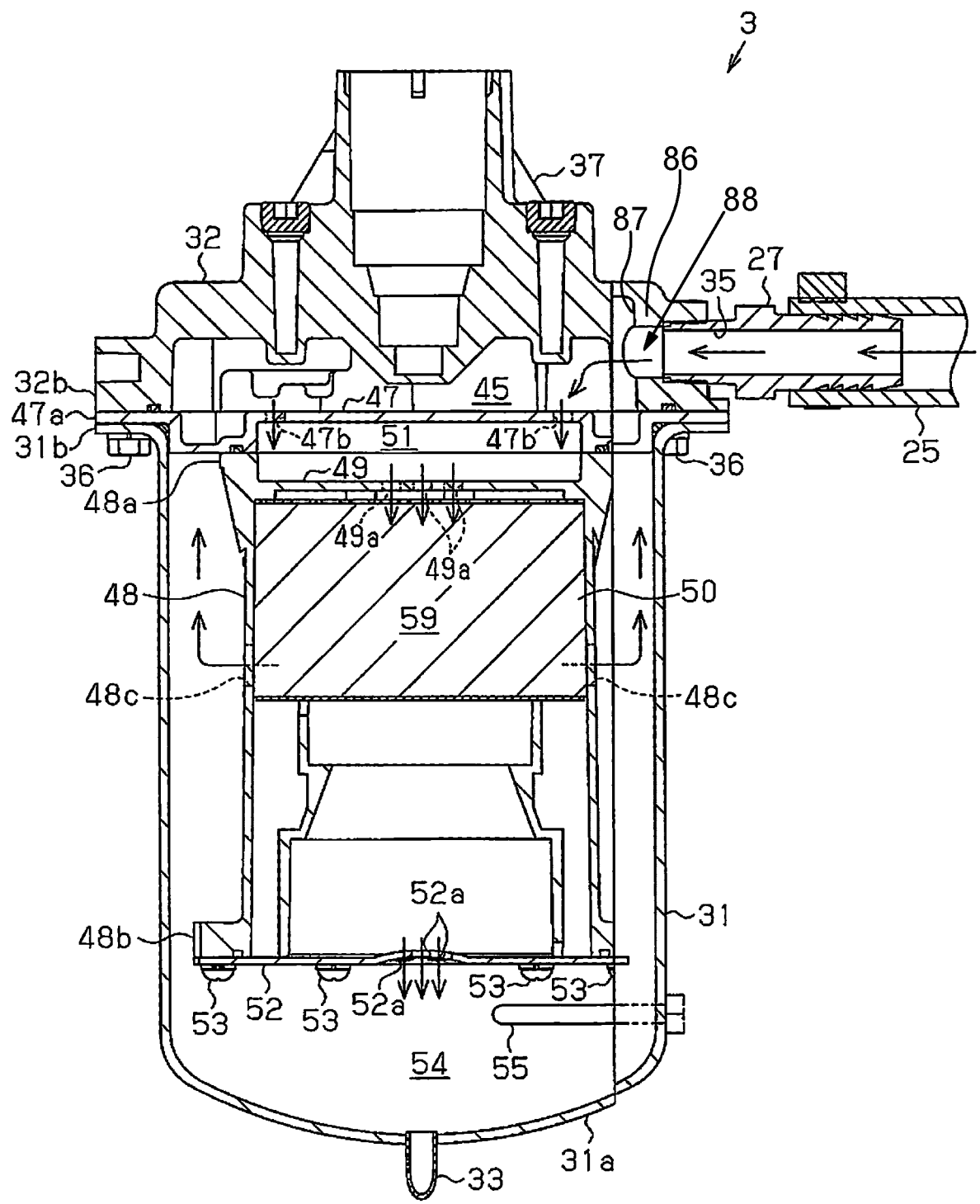
FIG. 9 is a cross-sectional view taken along line 9-9 in FIG. 7.
Figure 10:
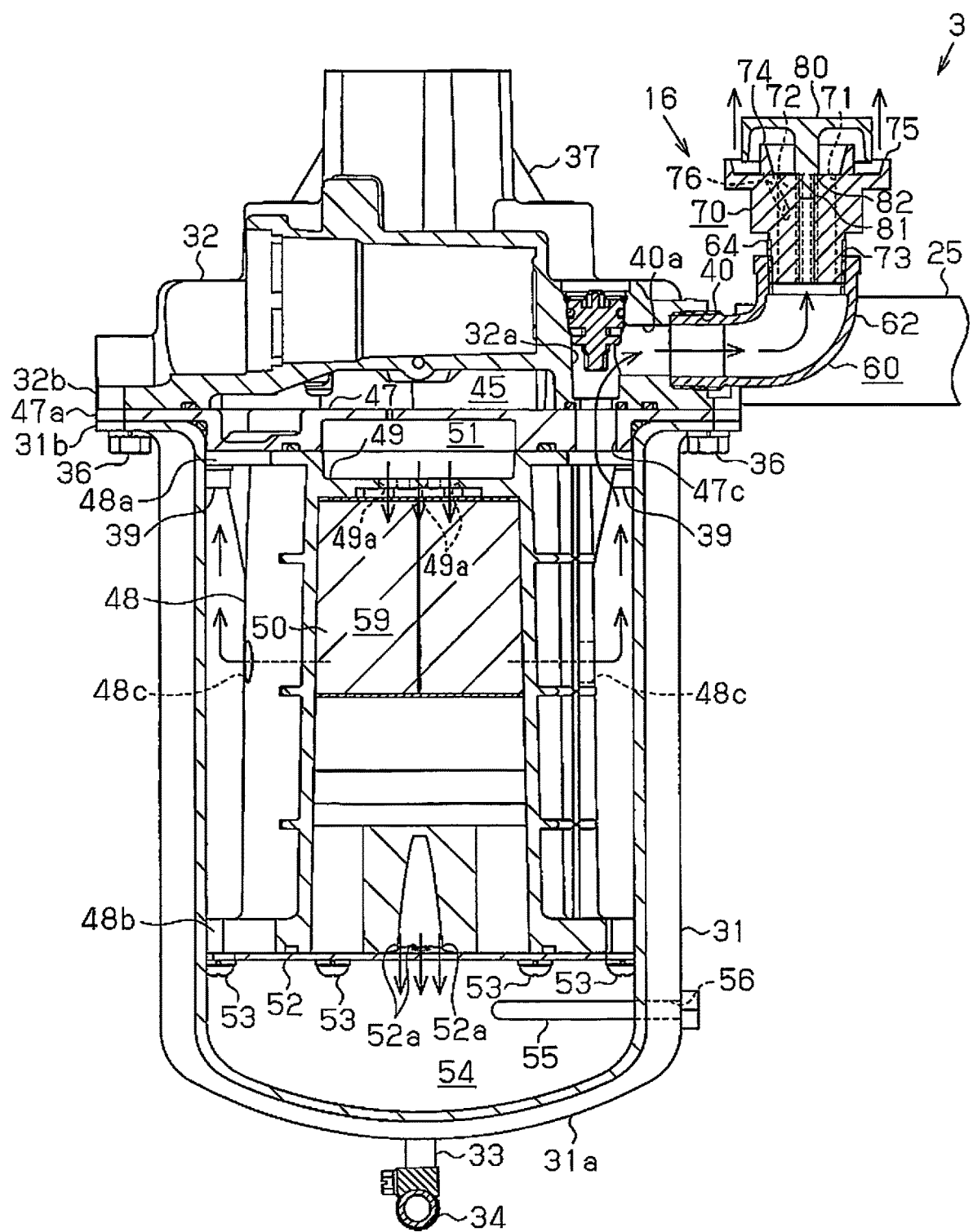
FIG. 10 is a cross-sectional view taken along line 10-10 in FIG. 7.

As shown in FIGS. 9 and 10, a disk-like cover 47, which closes the case 31 and the opening portion of the lid 32, is provided between the case 31 and the lid 32. The cover 47 and the case 31 are fastened to the lid 32 with bolts 36. That is, the bolts 36 are tightened to threaded bores 32c formed in a flange portion 32b provided on the lid 32. The bolts 36 and the threaded bores 32c function as the attaching and detaching mechanism. Furthermore, threaded portions of the bolts 36 extend through through-holes formed in a flange portion 31b provided on the case 31. The cover 47 has through-holes through which the threaded portions of the bolts 36 extend. Thus, the threaded portions of the bolts 36 extend through the through-holes of the flange portion 31b of the case 31 and the through-holes of a flange portion 47a of the cover 47. The bolts 36 are then screwed to the threaded bores 32c of the flange portion 32b of the lid 32 so that the lid 32, the cover 47, and the case 31 are fastened together. The case 31 can be detached from the lid 32 by removing the bolts 36 from the threaded bores 32c. The cover 47 has a communication hole 47c, which connects the inside of the case 31 to the outlet 40.

The space formed by the lid 32 and the cover 47 functions as the first expansion chamber 45. The first expansion chamber 45 comprises a vertically-extending wall portion 86 defining a side face 87. A through hole 88 is formed at the side face 87 of the first expansion chamber 45, and the inlet 35 of the housing or case 31 is connected to the through hole 88. A cylindrical accommodation member 48 with a vertically upper end closed is secured to the cover 47 with bolts 39. The accommodation member 48 accommodates a urethane foam block 50 such as a sponge block. The urethane foam block 50 functions as an impingement member. A flange portion 48a and a flange portion 48b are formed at an upper edge and a lower edge of the accommodation member 48, respectively. The bolts 39 extend through the flange portion 48a formed at the upper edge of the accommodation member 48 so that the accommodation member 48 is tightened to the cover 47. The space formed by the cover 47 and upper surface of the accommodation member 48 functions as a second expansion chamber 51. The cover 47 has through holes 47b, which connect the first expansion chamber 45 to the second expansion chamber 51. Through holes 49a are formed at the center portion of an upper base 49 of the accommodation member 48. The through holes 47b of the cover 47 and the through holes 49a of the upper base 49 of the accommodation member 48 are formed at positions that are not opposed to each another. The accommodation member 48 has through holes 48c formed at the lower end of the side face at intervals in the radial direction.

A disk-like support lid 52 is secured to the flange portion 48b, which is formed at the lower edge of the accommodation member 48, with screws 53. The support lid 52 supports the urethane foam block 50 accommodated in the accommodation member 48. The inner diameter of the support lid 52 is substantially the same as the inner diameter of the case 31. The space formed by the upper base 49 of the accommodation member 48 and the support lid 52 functions as a third expansion chamber 59. The support lid 52 has through holes 52a, which permit the oil and water removed by the urethane foam block 50 to drop. Thus, the lower section in the case 31 functions as a collected liquid storage portion 54.

A heating device for evaporating water in the collected liquid by heating the stored collected liquid, which is a heater 55 in this embodiment, is arranged in the collected liquid storage portion 54. The heater 55 is inserted in the case 31 from an insertion hole 56 formed in the side face of the case 31. The heater 55 directly heats the collected liquid stored in the collected liquid storage portion 54. Heating of the heater 55 is controlled by a non-illustrated thermostat.

Operation of the above-mentioned oil separator 3 will now be described.

As shown in FIG. 6, the purge air discharged from the air dryer 2 is introduced to the oil separator 3. The purge air contains oil and water.

As shown in FIG. 8, the purge air introduced through the inlet 35 strikes the baffle plates 46, is introduced into the oil separator 3 along the baffle plates 46, and expands in the first expansion chamber 45.

As shown in FIG. 9, the air expanded in the first expansion chamber 45 enters the second expansion chamber 51 via the through holes 47b formed in the cover 47. The air that has expanded in the second expansion chamber 51 enters the third expansion chamber 59 via the through holes 49a of the upper base 49 of the accommodation member 48. At this time, the oil and water that has struck the urethane foam block 50 is separated from the air. The liquid that contains the water and the oil trapped by the urethane foam block 50 moves through the urethane foam block 50. The liquid reaches the upper surface of the support lid 52, drops from the through holes 52a of the support lid 52 into the collected liquid storage portion 54, and is stored in the collected liquid storage portion 54. The liquid that has stored in the collected liquid storage portion 54 enters the drain hose 34 from the drain outlet 33. The collected liquid stored in the collected liquid storage portion 54 is heated by the heater 55. This evaporates the water in the collected liquid.

When the distal end of the drain hose 34 is detached from the securing member 91, the atmospheric air flows into the securing member 91, and the liquid in the drain hose 34 is located at the same level as the collected liquid in the collected liquid storage portion 54. Thus, the amount of the collected liquid in the collected liquid storage portion 54 can be checked by visually checking the liquid in the drain hose 34.

As shown in FIG. 10, oil and water are separated from the air that has entered the third expansion chamber 59 from the through holes 49a of the upper base 49 of the accommodation member 48. The air then enters the case 31 from the through holes 48c on the side face of the accommodation member 48. The air that has entered the case 31 passes through the communication hole 47c of the cover 47 and the communication section 32a of the lid 32, flows into the elbow member 60 through the outlet 40, and is discharged to the atmosphere. Thus, the air that has entered the case 31 hardly contacts the collected liquid in the collected liquid storage portion 54, and is discharged from the outlet 40. The air that is discharged from the outlet 40 is cleaned air that does not contain oil.

When draining the collected liquid stored in the collected liquid storage portion 54, the distal end of the drain hose 34 is detached from the one-touch coupler 92 by manipulating the one-touch coupler 92, and the distal end of the drain hose 34 is held lower than the surface of the collected liquid in the collected liquid storage portion 54. In this manner, the collected liquid is drained from the collected liquid storage portion 54.

When cleaning inside the case 31 or replacing the impingement member, which is the urethane foam block 50 in this embodiment, the bolts 36 are removed from the threaded bores 32c to detach the case 31 and the cover 47 from the lid 32. The detached case 31 and the cover 47 can be cleaned. Furthermore, the screws 53, which secure the support lid 52 to the accommodation member 48, are removed to take out the urethane foam block 50 from the accommodation member 48, and the urethane foam block 50 is replaced. After replacement, the support lid 52 is secured to the accommodation member 48 with the screws 53, and the bolts 36 are tightened to the threaded bores 32c of the lid 32 so that the case 31 and the cover 47 are attached to the lid 32.

The second embodiment provides the following advantages in addition to the above described advantages (1) and (2).

(3) Since liquid containing the separated oil is stored in the case 31, which is the housing of the oil separator 3, together with water, the inside of the casing needs to be cleaned and the impingement member needs to be replaced periodically. The oil separator 3 has the inlet 35 and the outlet 40 formed in the lid 32, and the purge air introduced into the case 31 through the inlet 35 moves vertically downward through the expansion chambers 45, 51, 59, and cleaned air is discharged from the outlet 40. The bolts 36 and the threaded bores 32c, which serve as the attaching and detaching mechanism, allow the case 31 to be detached from and attached to the lid 32. Thus, the housing is easily separated by detaching the case 31 from the lid 32.

(4) The inlet 35 and the outlet 40 are formed on a surface of the lid 32 that faces in the horizontal direction. Since the inlet 35 and the outlet 40 are not formed in the case 31, no tubes are connected to the case 31. Thus, it is easy to detach the case 31 from the lid 32. Also, since no tubes are connected to the upper surface or the bottom face of the lid 32 in the vertical direction, the vertical length is prevented from being increased.

(5) The heater 55 is inserted through the insertion hole 56, which is provided at the lower section of the case 31, and the heater 55 directly heats the collected liquid. Thus, the amount of collected liquid is reduced by evaporating the water contained in the collected liquid. This reduces the number of times the case 31 is detached from the lid 32, and extends the life of the attaching and detaching mechanism. Furthermore, heat transfer from the heater 55 to the collected liquid is high, and the collected liquid is efficiently heated as compared to a case in which the collected liquid is indirectly heated.

The above described second embodiment may be modified as follows.

Figure 11:
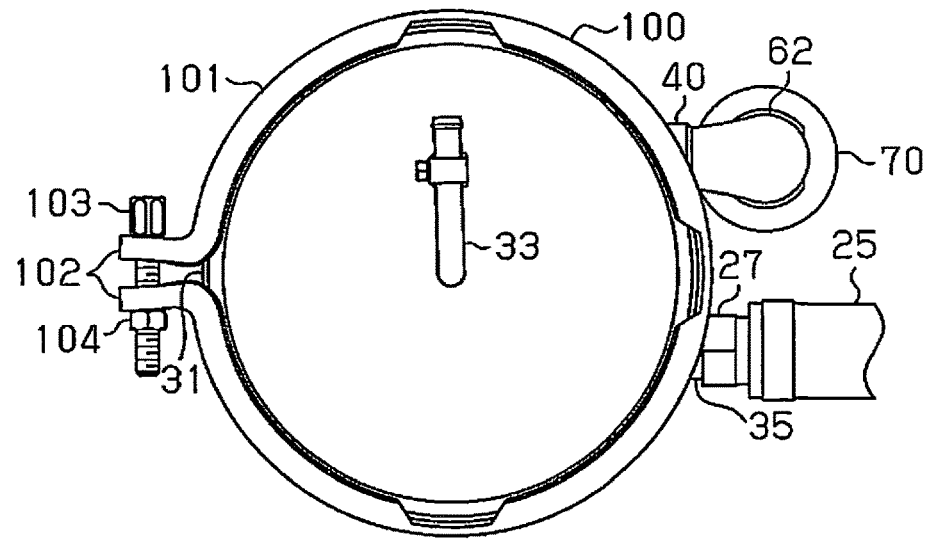
FIG. 11 is a bottom view illustrating an attaching and detaching mechanism of an oil separator according to a modification.
Figure 12:
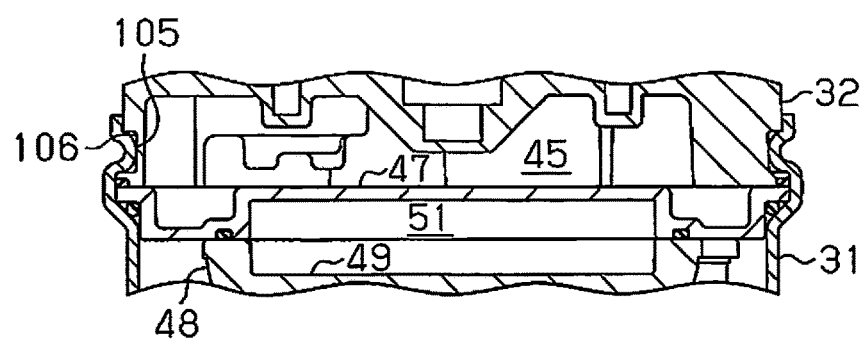
FIG. 12 is a cross-sectional view illustrating a attaching and detaching mechanism of an oil separator according to a modification.

In the second embodiment, as the attaching and detaching mechanism, the bolts 36 are tightened to the threaded bores 32c. However, other attaching and detaching mechanisms may be employed. For example, as shown in FIG. 11, a clamp ring 100 may be employed as the attaching and detaching mechanism. The clamp ring 100 holds the flange portion 32b of the lid 32 and the flange portion 31b of the case 31 and tightens radially inward. The clamp ring 100 includes a ring 101, which has a U-shaped cross-section and holds the flange portions 32b, 31b, a bolt 103, which tightens tightening portions 102 of the ring 101, and a nut 104. If the clamp ring 100 is employed, the case 31 is easily attached and detached by only turning the bolt 103. Also, as shown in FIG. 12, a recess-projection fitting structure may be employed as the attaching and detaching mechanism. Instead of the flange portion 31b of the case 31, a projection 105, which projects inward of the case 31, is provided in the circumferential direction, and instead of the flange portion 32b of the lid 32, a recess 106 is provided. The case 31 is pressed toward the lid 32 so that the projection 105 of the case 31 is fitted to the recess 106 of the lid 32. The recess may be provided in the case 31, and the projection may be provided on the lid 32. If the recess-projection fitting is employed, the case 31 is attached on the lid 32 only by fitting. Thus, the case 31 is easily attached and detached. Furthermore, a locking screw may be provided to prevent rotation of the case 31 with respect to the lid 32.

Figure 13:
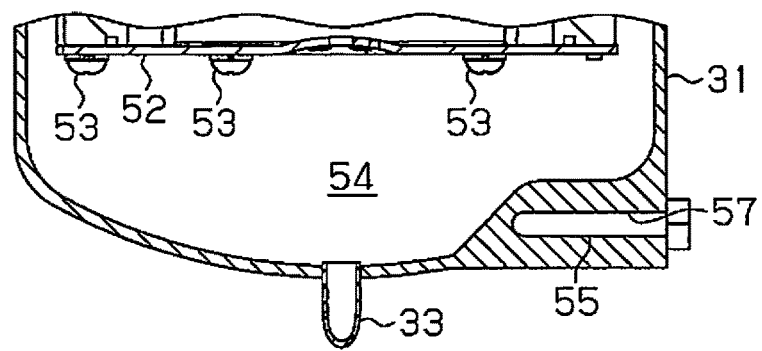
FIG. 13 is a cross-sectional view illustrating the structure of the lower part of an oil separator according to a modification.

In the second embodiment, the collected liquid is directly heated by inserting the heater 55 through the insertion hole 56 into the collected liquid storage portion 54. However, as shown in FIG. 13, an accommodation portion 57, which accommodates the heater 55, may be formed in the case 31, and the case 31 may be heated. In this case, the water contained in the collected liquid is evaporated, and the amount of collected liquid is reduced. This reduces the number of times the case is removed from the lid, and thus extends the life of the attaching and detaching mechanism. Also, since the heater 55 does not contact the collected liquid, the heater is prevented from being deteriorated due to the collected liquid.

In the second embodiment, the inlet 35 and the outlet 40 are respectively provided on a side of the lid 32 that faces in the horizontal direction, but the inlet 35 and the outlet 40 may be provided on the surface facing in the vertical direction such as an upper section of the lid 32.

In the second embodiment, the drain hose 34 is connected to the drain outlet 33 of the case 31. However, the drain hose 34 may be omitted, and the collected liquid may be directly drained from the drain outlet 33. In this case, the drain outlet 33 is provided with a collected liquid flow prevention member.

In the second embodiment, the first expansion chamber 45, the second expansion chamber 51, and the third expansion chamber 59 are provided in the oil separator 3. However, at least one of the first expansion chamber 45, the second expansion chamber 51, and the third expansion chamber 59 may be employed.

In the second embodiment, the drain hose 34 may be graduated.

In the second embodiment, a member such as a nonwoven fabric filter may be provided upstream or downstream of the urethane foam block 50, or in the expansion chambers 45, 51. In this case, the removal rate of the oil component is increased. Furthermore, a member such as a nonwoven fabric filter may be charged with static electricity. In this case, the removal rate of the oil component is further increased.

In the second embodiment, the urethane foam block 50 is employed as the impingement member, but other members such as a crushed aluminum member may be employed.

Third Embodiment

An oil separator according to a third embodiment will now be described with reference to FIGS. 14 to 20.

Figure 14:
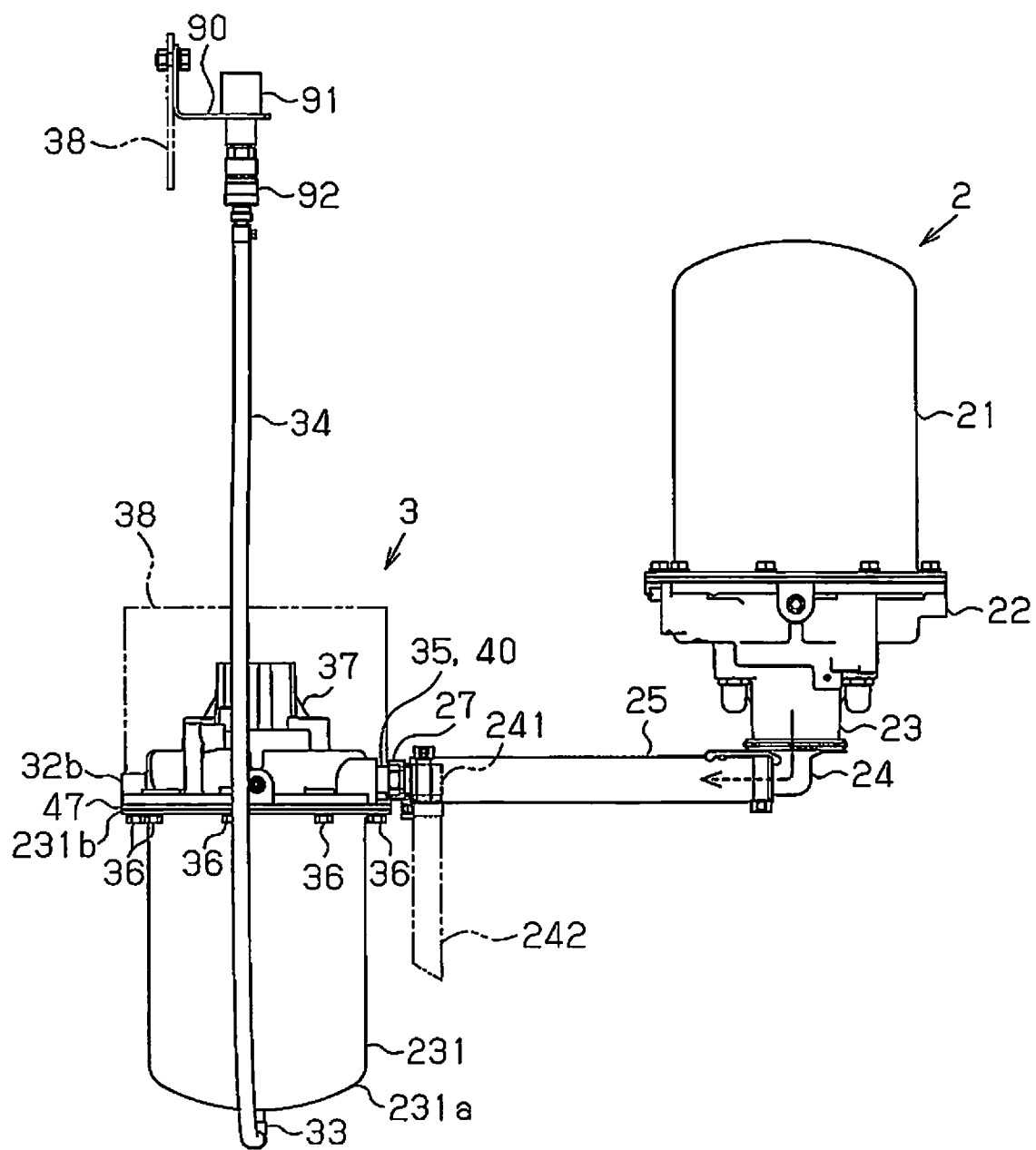
FIG. 14 is a diagram illustrating a mounting state of an oil separator according to a third embodiment of the present invention and a connection state of the oil separator and an air dryer.

As shown in FIG. 14, the distal end of a drain hose 34 is detachably attached to a support member 90, which is secured to, for example, the chassis 38 of a vehicle. That is, a securing member 91 is secured to the support member 90. A one-touch coupler 92 is secured to the lower end of the securing member 91. The one-touch coupler 92 allows the distal end of the drain hose 34 to be attached to the securing member 91 by a single operation. The drain hose 34 is secured to the securing member 91 by inserting the distal end of the drain hose 34 to the one-touch coupler 92, and is detached from the securing member 91 by manipulating the one-touch coupler 92. The distal end of the drain hose 34 is attached to the securing member 91 such that an opening portion formed in the distal end opens vertically upward.

Figure 19:
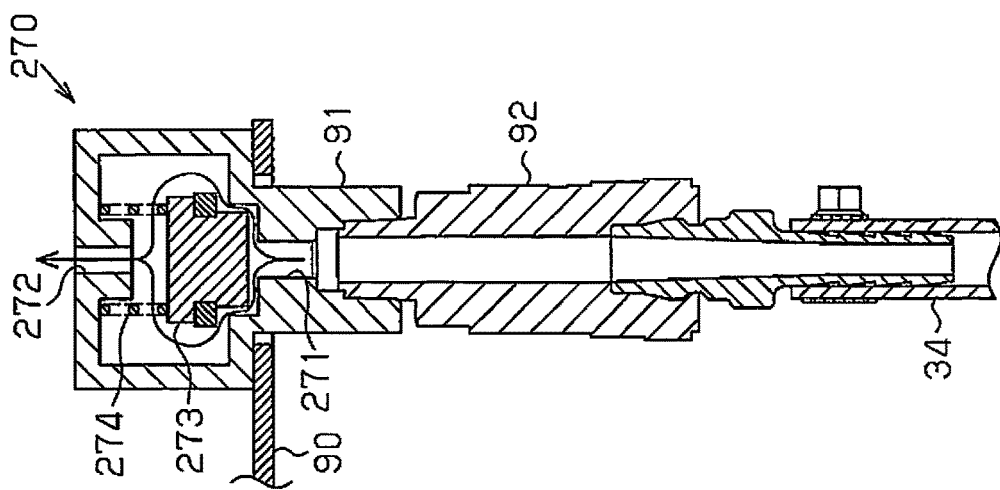
FIG. 19 is a cross-sectional view illustrating the structure of a fixing member for fixing the distal end of a drain hose.

Typically, when unloading operation is performed in an air dryer to regenerate the desiccant, the pressure in the purge tank (the purge pressure) causes purge air to flow from the purge tank into the oil separator. If liquid that contains separated oil exists in the oil separator, the liquid can flow out through the drain outlet due to the pressure acting on the liquid when the purge air rushes into the oil separator. As illustrated in FIG. 19, the securing member 91 of the third embodiment includes a discharge valve 270, which suppresses outflow of liquid from the oil separator due to the purge pressure during the unloading operation of the air dryer 2. The discharge valve 270 is closed during the unloading operation of the air dryer 2 and is opened at times other than such operation.

Figure 15:
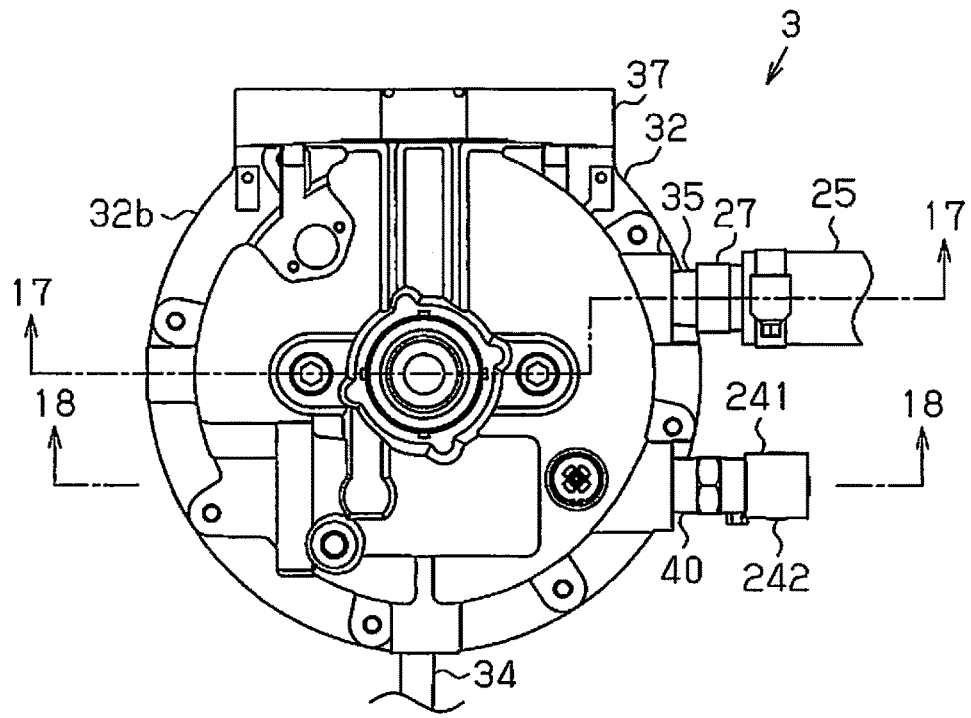
FIG. 15 is a top view illustrating the position of an inlet and an outlet of an oil separator.

As shown in FIG. 15, an inlet 35 and an outlet 40 provided in the lid 32 are open toward the same direction (rightward in the drawing). A connecting hose 25 is connected to the inlet 35 via the coupling member 27. A discharge hose 242 is connected to the outlet 40 via a connecting member 241, which extends in the horizontal direction and bends vertically downward. That is, the coupling member 27 and the connecting member 241 are arranged next to each other. The distal end opening of the discharge hose 242 is formed such that the vertical length of the discharge hose 242 close to the case 231 is shorter than the length of the opposed portion, and the end face of the distal end opening is inclined with respect to the horizontal direction. This facilitates discharging of the cleaned air from the discharge hose 242, and improves the water-tightness.

Figure 16:
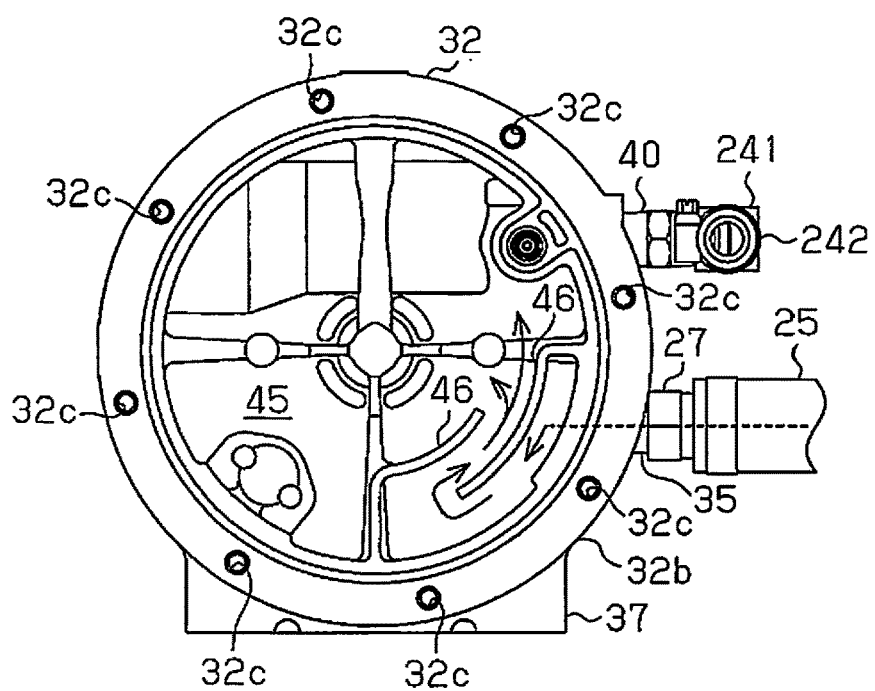
FIG. 16 is a bottom view illustrating the inside of the lid of the oil separator.

As shown in FIG. 16, the lid 32 is a cylinder having a vertically upper end closed. Two baffle plates 46 extend from the inner wall of the lid 32 in the vicinity of the inlet 35 to be perpendicular to the flow direction of the purge air introduced through the inlet 35. The internal space of the lid 32 functions as a first expansion chamber 45, which expands the purge air introduced from the inlet 35. The lid 32 has a communication section 32a, which connects the inside of the case 231 to the outlet 40.

Figure 17:
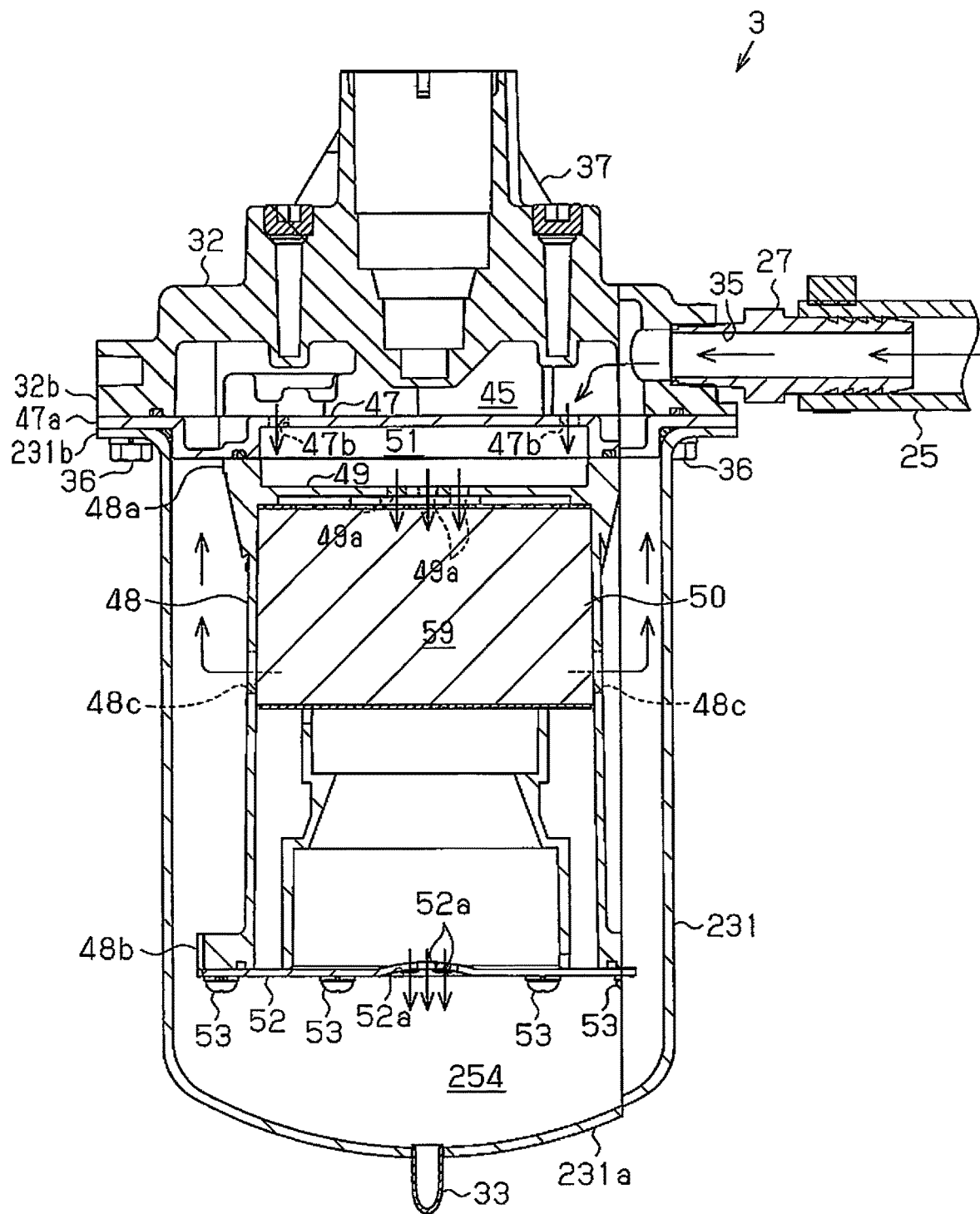
FIG. 17 is a cross-sectional view taken along line 17-17 in FIG. 15.
Figure 18:
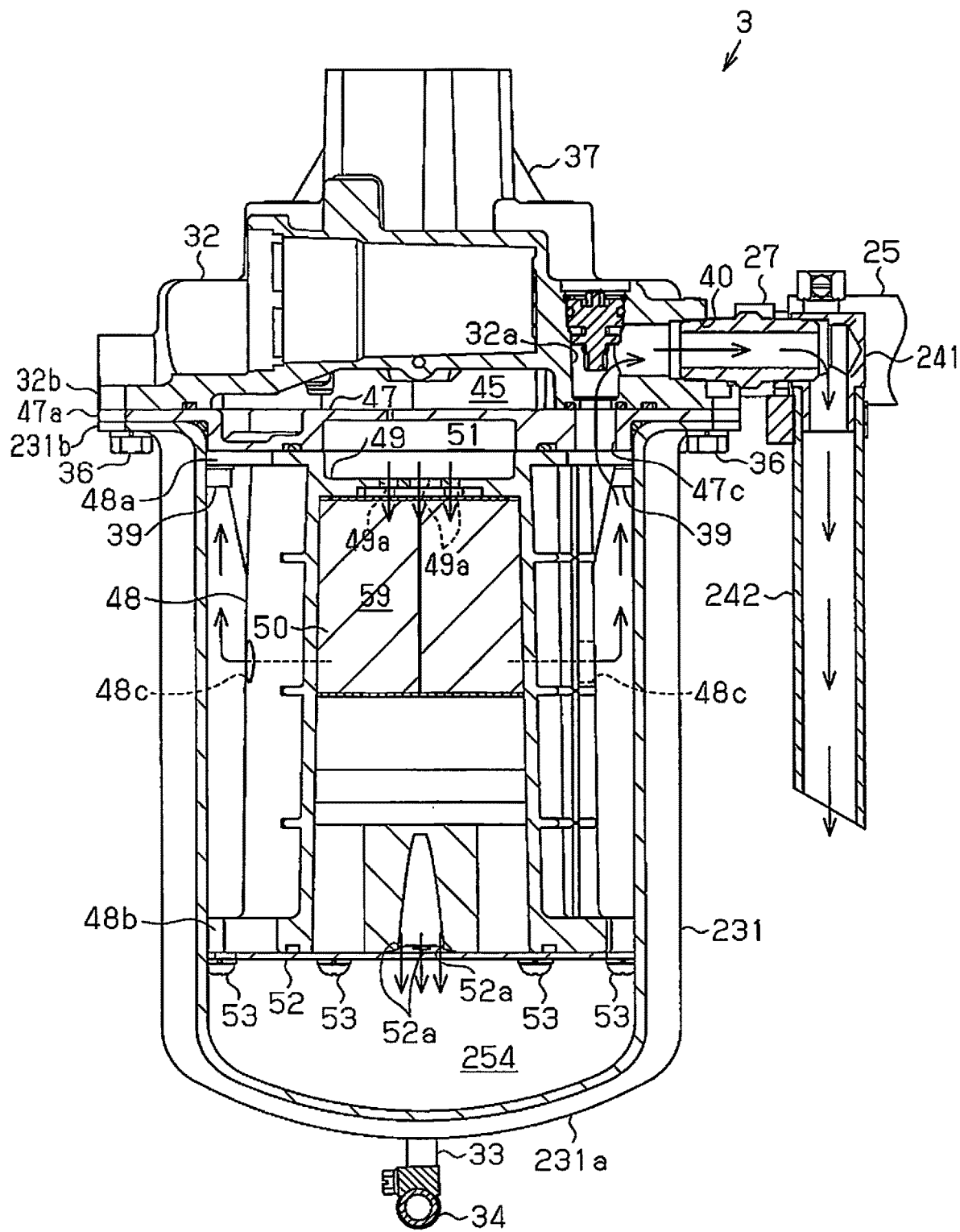
FIG. 18 is a cross-sectional view taken along line 18-18 in FIG. 15.

As shown in FIGS. 17 and 18, a disk-like cover 47, which closes the case 231 and the opening portion of the lid 32, is provided between the case 231 and the lid 32. The cover 47 and the case 231 are fastened to the lid 32 with bolts 36. That is, the bolts 36 are tightened to threaded bores 32c formed in a flange portion 32b provided on the lid 32. Furthermore, threaded portions of the bolts 36 extend through through-holes formed in a flange portion 231b provided on the case 231. The cover 47 has through-holes through which the threaded portions of the bolts 36 extend. Thus, the threaded portions of the bolts 36 extend through the through-holes of the flange portion 231b of the case 231 and the through-holes of a flange portion 47a of the cover 47. The bolts 36 are then screwed to the threaded bores 32c of the flange portion 32b of the lid 32 so that the lid 32, the cover 47, and the case 231 are fastened together. The cover 47 has a communication hole 47c, which connects the inside of the case 231 to the outlet 40.

Figure 20:
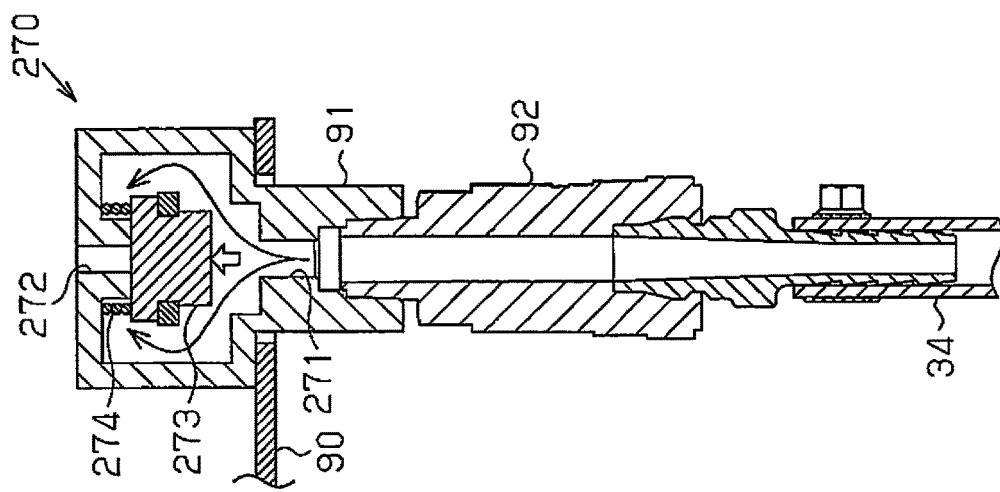
FIG. 20 is a cross-sectional view illustrating the structure of a fixing member for fixing the distal end of the drain hose.

As shown in FIGS. 19 and 20, the securing member 91 has a movement space, which accommodates a valve member 273 and an urging spring 274. The valve member 273 is movable between an inflow port 271 and an outlet 272. The valve member 273 is urged toward the inflow port 271 by the urging spring 274, to be located at a position where the valve member 273 does not closes the inflow port 271 or the outlet 272 (see FIG. 19). When receiving a force (pressure) that is greater than the urging force of the urging spring 274, the valve member 273 closes the outlet 272 (see FIG. 20). Therefore, in a state where the force acting on the valve member 273 is less than the force of the urging spring 274, the discharge valve 270 discharges air and the like from the outlet 272. In a state where the force acting one the valve member 273 is greater than the force of the urging spring 274, the discharge valve 270 does not discharge air or the like from the outlet 272.

Operation of the above described oil separator 3 will now be described.

As shown in FIG. 14, the purge air discharged from the air dryer 2 is introduced to the oil separator 3. The purge air contains oil and water.

As shown in FIG. 16, the purge air introduced through the inlet 35 strikes the baffle plates 46, is introduced into the oil separator 3 along the baffle plates 46, and expands in the first expansion chamber 45.

As shown in FIG. 17, the air expanded in the first expansion chamber 45 enters the second expansion chamber 51 via the through holes 47b formed in the cover 47. The air that has expanded in the second expansion chamber 51 enters the third expansion chamber 59 via the through holes 49a of the upper base 49 of the accommodation member 48. At this time, the oil and water that has struck the urethane foam block 50 is separated from the air. The liquid that contains the water and the oil trapped by the urethane foam block 50 moves through the urethane foam block 50. The liquid reaches the upper surface of the support lid 52, drops from the through holes 52a of the support lid 52 into a collected liquid storage portion 254, and is stored in the collected liquid storage portion 254. The liquid that has stored in the collected liquid storage portion 254 enters the drain hose 34 from the drain outlet 33.

If the purge air rushes into the air dryer 2, the liquid stored in the collected liquid storage portion 254 receives pressure. At this time, when the collected liquid in the drain hose 34 is pushed, the valve member 273 of the discharge valve 270 receives pressure and closes the outlet 272. This prevents the collected liquid from flowing out. When there is no inflow of purge air, the atmospheric air flows into the securing member 91 via the outlet 272, so that the collected liquid in the drain hose 34 is located at the same level as the collected liquid in the collected liquid storage portion 254. Thus, the amount of the collected liquid in the collected liquid storage portion 254 can be checked by visually checking the liquid in the drain hose 34.

As shown in FIG. 18, oil and water are separated from the air that has entered the accommodation member 48 from the through holes 49a of the upper base 49 of the accommodation member 48. The air then enters the case 231 from the through holes 48c on the side face of the accommodation member 48. The air that has entered the case 231 passes through the communication hole 47c of the cover 47 and the communication section 32a of the lid 32, flows through the outlet 40 and the connecting member 241 into the discharge hose 242 to be discharged to the atmosphere. Thus, the air that has entered the case 231 hardly contacts the collected liquid in the collected liquid storage portion 254, and is discharged from the outlet 40. The air that is discharged from the outlet 40 is cleaned air that does not contain oil.

When draining the collected liquid stored in the collected liquid storage portion 254, the distal end of the drain hose 34 is detached from the one-touch coupler 92 by manipulating the one-touch coupler 92, and the distal end of the drain hose 34 is held lower than the surface of the collected liquid in the collected liquid storage portion 254. In this manner, the collected liquid is drained from the collected liquid storage portion 254. When draining the collected liquid, the discharge hose 242 may be detached from the connecting member 241 of the outlet 40 and a pressurizing device such as a compressor may be connected to the connecting member 241 to pressurize the inside of the case 231. This promotes the drainage and shortens the drainage time. The outlet 40 corresponds to a pressurizing device connecting portion.

The third embodiment provides the following advantages in addition to the above described advantages (3) and (4).

(6) The drain hose 34 is connected to the outlet 33 for draining collected liquid. An opening portion is formed at the distal end of the drain hose 34. The opening portion of the drain hose 34 is closed by the securing member 91 during unloading operation of the air dryer 2. Therefore, during the unloading operation of the air dryer 2, if the purge pressure causes purge air to rush into the oil separator and applies pressure on the collected liquid containing separated oil, the collected liquid is prevented from flowing out from the separator 3. Since the distal end of the drain hose 34 is detachably attached to the securing member 91, the distal end of the drain hose 34 can be detached from the securing member 91 when draining the collected liquid.

(7) The distal end of the drain hose 34 is attached to the securing member 91 such that the opening portion formed at the distal end opens vertically upward. This suppresses outflow of collected liquid in the drain hose 34 from the distal end of the drain hose 34.

(8) During the unloading operation of the air dryer 2, the discharge valve 270 of the securing member 91 is closed. Thus, collected liquid is prevented from flowing out via the discharge valve 270. At the times other than the unloading operation, the discharge valve 270 of the securing member 91 is open. Thus, the level of the collected liquid in the drain hose 34 matches with the level of the level of the collected liquid in the case 231. This allows the amount of the collected liquid in the case 231 can be checked without detaching the distal end of the drain hose 34 from the securing member 91.

(9) By connecting a pressurizing device to the outlet 40, which serves as a pressurizing device connecting portion, and pressurizing the inside of the case 231, the drainage of the collected liquid is promoted and the required time is shortened.

Fourth Embodiment

An oil separator according to a fourth embodiment will now be described with reference to FIG. 21. The oil separator of the fourth embodiment is substantially identical to the oil separator of the third embodiment except that the structure of a securing member to which the distal end of the drain hose is attached is different from that of the third embodiment. Differences from the third embodiment will mainly be discussed below.

Figure 21:
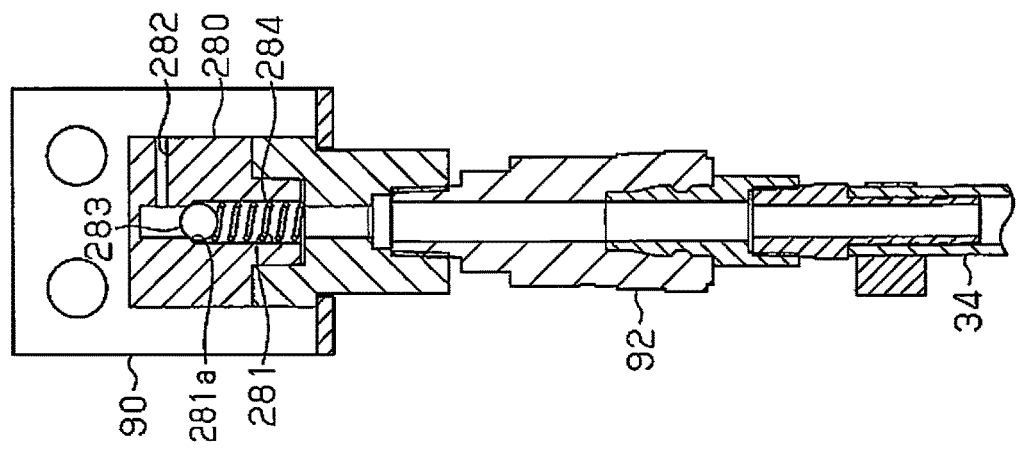
FIG. 21 is a cross-sectional view illustrating the structure of a fixing member for fixing the distal end of a drain hose according to a fourth embodiment of the present invention.

As shown in FIG. 21, a securing member 280 includes an insertion hole 281, which has a step 281a, and an orifice 282, which communicates with the insertion hole 281. The insertion hole 281 opens to the basal end of the securing member 280. The orifice 282 communicates with the distal end of the insertion hole 281. A steel ball 283, which functions as a valve member, is fitted in the insertion hole 281. The steel ball 283 is urged toward the distal end of the securing member 280 by an urging spring 284. When seated on the step 281a of the insertion hole 281, the steel ball 283 closes the insertion hole 281. While urging the steel ball 283 so that the steel ball 283 is seated on the step 281a, the urging spring 284 allows the steel ball 283 to be disengaged from the step 281a by vibration of the vehicle. When the steel ball 283 is disengaged from the step 281a, air is allowed to flow through the orifice 282. When the steel ball 283 is seated on the step 281a, the collected liquid in the drain hose 34 does flow out.

Operation of the securing member 280 will now be described.

As shown in FIG. 21, if purge air rushes into the air dryer 2, the liquid stored in the collected liquid storage portion 254 receives pressure. When the collected liquid in the drain hose 34 is pushed, the steel ball 283 receives pressure and closes the insertion hole 281. This prevents the collected liquid from flowing out. When there is no inflow of purge air, vibration of the vehicle causes the steel ball 283 to be disengaged from the step 281a, so that air flows in through the orifice 282. Accordingly, the collected liquid in the drain hose 34 is located at the same level as the collected liquid in the collected liquid storage portion 254. Thus, the amount of the collected liquid in the collected liquid storage portion 254 can be checked by visually checking the liquid in the drain hose 34.

The fourth embodiment provides the following advantage in addition to the advantages (6) to (9) of the third embodiment.

(10) When the steel ball 283 of the securing member 280 is seated on the step 281a of the insertion hole 281, the collected liquid in the drain hose 34 is prevented from flowing out. Further, when the steel ball 283 is disengaged from the step 281a by vibration of the vehicle, the atmospheric air can be automatically introduced into the drain hose 34 via the orifice 282.

Fifth Embodiment

An oil separator according to a fifth embodiment will now be described with reference to FIGS. 22 and 23. The oil separator of the fifth embodiment is substantially identical to the oil separator of the third embodiment except that the structure of a securing member to which the distal end of the drain hose is attached is different from that of the third embodiment. Differences from the third embodiment will mainly be discussed below.

Figure 22:
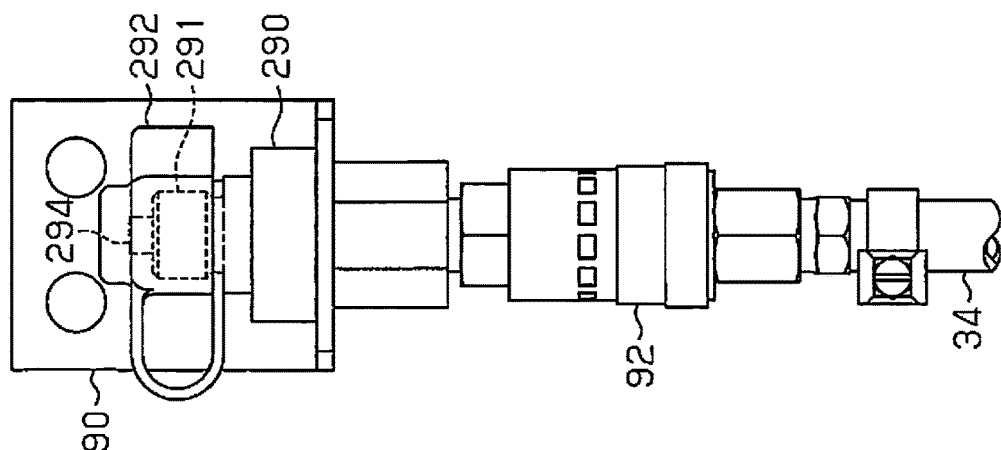
FIG. 22 is a side view illustrating the structure of a fixing member for fixing the distal end of a drain hose according to a fifth embodiment of the present invention.

As shown in FIG. 22, a securing member 290 has a manual operation portion 291 at the distal end. The manual operation portion 291 is manually operated to introduce the atmospheric air into the drain hose 34 connected to the securing member 290. The manual operation portion 291 is covered with a detachable cap 292.

Figure 23:
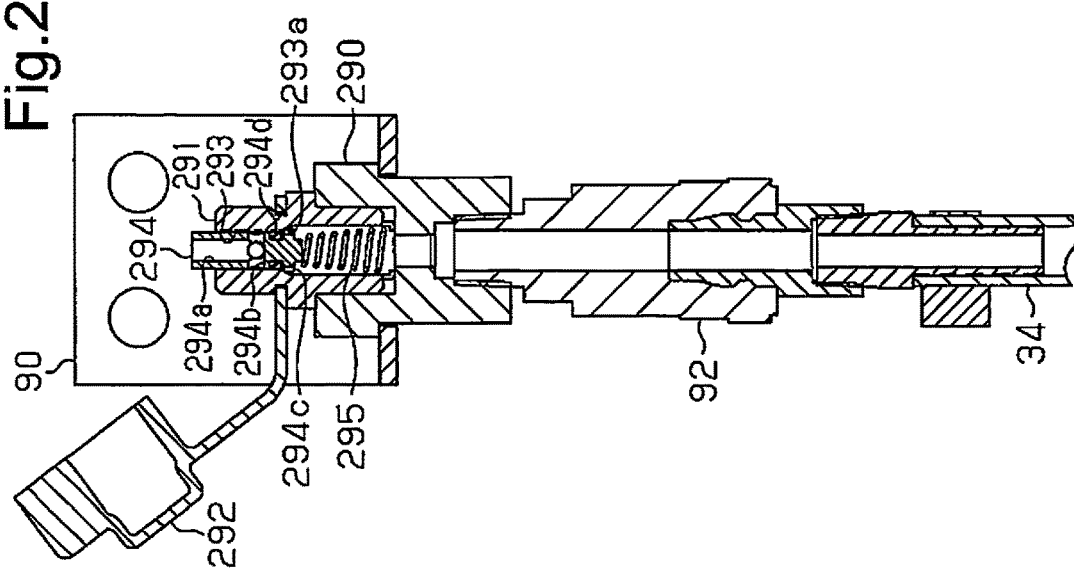
FIG. 23 is a cross-sectional view illustrating the structure of a fixing member for fixing the distal end of a drain hose.

As shown in FIG. 23, the manual operation portion 291 includes a through hole 293, which has a step 293a. A cylindrical pushing member 294 is fitted in the through hole 293. The pushing member 294 has through hole 294a and a communication hole 294b formed in the side to communicate with the through hole 294a. The pushing member 294 has a radial projection 294c in a lower portion to engage with the step 293a of the through hole 293. A sealing member 294d is fitted about an upper portion of the projection 294c. The sealing member 294d contacts the inner surface of the through hole 293 to close the through hole 293. The through hole 293 accommodates an urging spring 295 that urges the pushing member 294 toward the distal end of the manual operation portion 291 (the securing member 290). The pushing member 294 always closes the through hole 293 by means of the urging spring 295. When the pushing member 294 is pushed, the through hole 293 of the manual operation portion 291 is connected to the through hole 294a and the communication hole 294b of the pushing member 294. This allows air to flow between the outside and the inside. At normal times (when the manual operation portion 291 is not operated), the pushing member 294 closes the through hole 293, so that collected liquid in the drain hose 34 does not flow out. When manually operated, the pushing member 294 does not close the through hole 293. This allows air to enter and exit the drain hose 34.

Operation of the securing member 280 will now be described.

As shown in FIG. 23, if purge air rushes into the air dryer 2, the liquid stored in the collected liquid storage portion 254 receives pressure. In this state, the pushing member 294 closes the through hole 293. Therefore, the manual operation portion 291 of the securing member 290 prevents the collected liquid in the drain hose 34 from flowing out. To check the amount of collected liquid in the drain hose 34, the pushing member 294 is pushed to allow the inside of the drain hose 34 to communicate with the atmosphere, so that air is allowed to enter or exit the drain hose 34. Thus, the collected liquid in the drain hose 34 is located at the same level as the collected liquid in the collected liquid storage portion 254.

The fifth embodiment provides the following advantage in addition to the advantages (6) to (9) of the third embodiment.

(11) When the manual operation portion 291 of the securing member 290 is not manually operated, the securing member 290 is closed. This prevents the collected liquid in the drain hose 34 from flowing out. When necessary, the pushing member 294 of the manual operation portion 291 is operated to open the through hole 293 of the manual operation portion 291, so that the atmospheric air can be introduced to the inside of the drain hose 34.

The above described third to fifth embodiments may be modified as follows.

Figure 24:
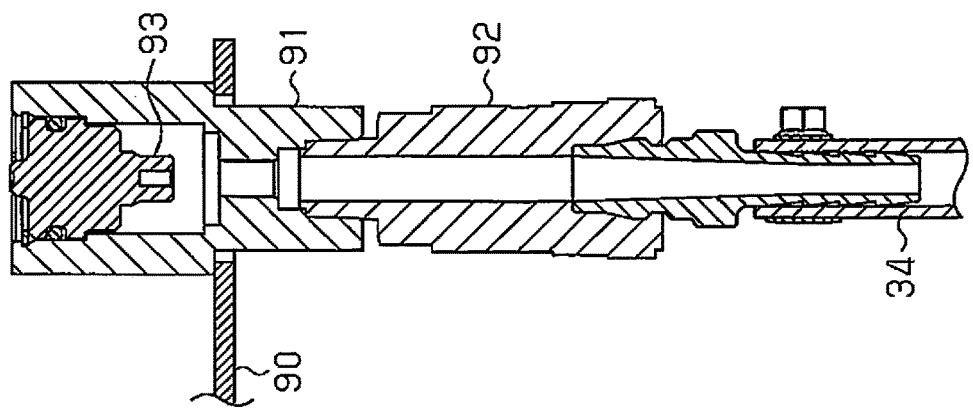
FIG. 24 is a cross-sectional view illustrating the structure of a fixing member for fixing the distal end of a drain hose according to a modification.
Figure 25:
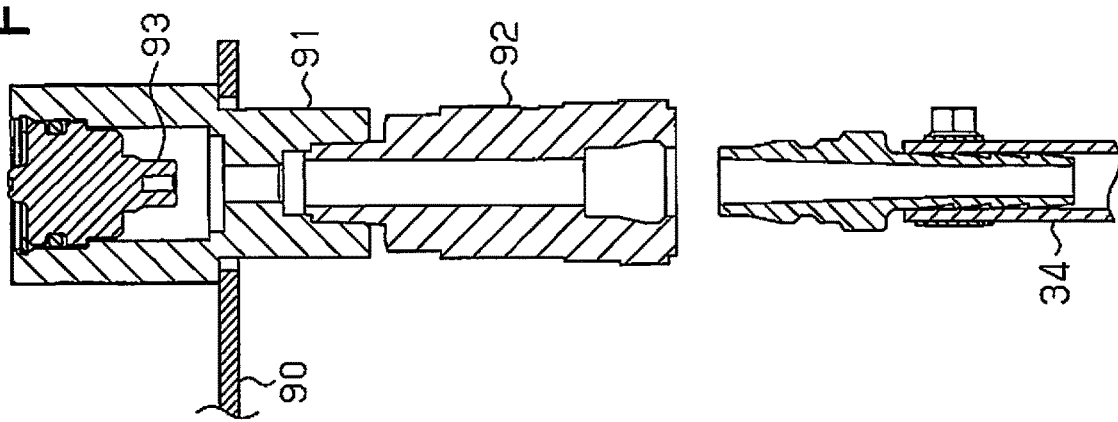
FIG. 25 is a cross-sectional view illustrating the structure of a fixing member for fixing the distal end of a drain hose according to a modification.

In the third to fifth embodiments, the securing member 91 has the discharge valve 270. However, the discharge valve 270 may be replaced by a sealing stopper that always closes the securing member 91. For example, a sealing stopper 93 may be attached to the securing member 91 as shown in FIG. 24. When checking the amount of collected liquid in the collected liquid storage portion 254, the distal end of the drain hose 34 is detached from the one-touch coupler 92 of the securing member 91 as shown in FIG. 25. Accordingly, the collected liquid is prevented from flowing out from the distal end of the drain hose 34 with a simple structure. Also, the amount of the collected liquid in the storage portion 254 can be checked.

Figure 26:
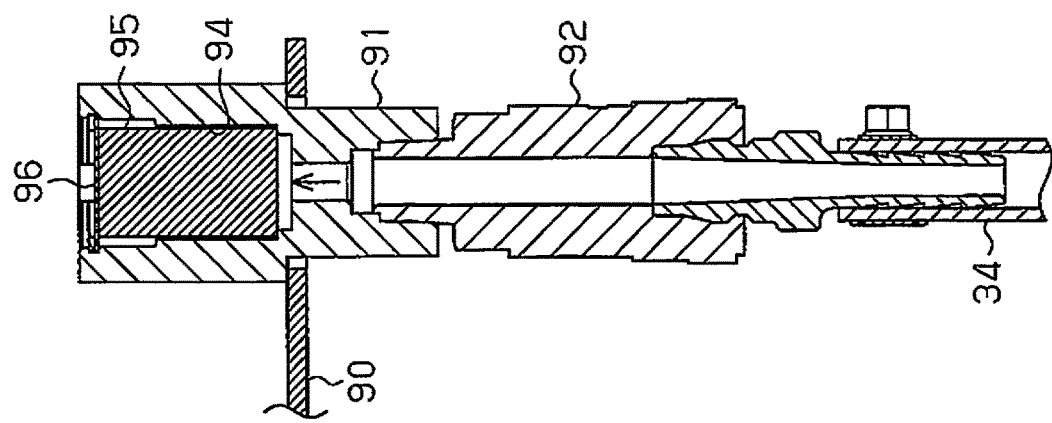
FIG. 26 is a cross-sectional view illustrating the structure of a fixing member for fixing the distal end of a drain hose according to a modification.

In the third to fifth embodiments, the securing member 91 has the discharge valve 270. However, the discharge valve 270 may be replaced by a constriction member. For example, a constriction member 96 is accommodated in an accommodation space 94 of the securing member 91 as shown in FIG. 26. That is, a urethane foam block 95 such as a sponge block, the size of which is substantially the same as that of the accommodation space 94, is inserted in the accommodation space 94, and the constriction member 96 is located at a position closer to the distal end of the accommodation space 94. The constriction member 96 may be a moisture-permeable waterproof material. In this case, if purge air rushes into the case 231 to apply pressure to the collected liquid, the constriction member 96 suppresses the flow of the liquid, thereby suppressing the flow of the liquid to the outside of the oil separator 3.

The securing member 91 may have both the discharge valve 270 and the constriction member 96.

In the third to fifth embodiments, the outlet 40 functions as a pressurizing device connecting portion, to which a pressurizing device is connected when the collected liquid is drained. However, the case 231 may have a connecting portion to which a pressurizing device is connected.

In the third to fifth embodiments, the first expansion chamber 45, the second expansion chamber 51, and the third expansion chamber 59 are provided in the oil separator 3. However, at least one of the first expansion chamber 45, the second expansion chamber 51, and the third expansion chamber 59 may be employed.

In the third to fifth embodiments, the drain hose 34 may be graduated.

In the third to fifth embodiments, a member such as a nonwoven fabric filter may be provided upstream or downstream of the urethane foam block 50, or in the expansion chambers 45, 51. In this case, the removal rate of the oil component is increased. Furthermore, a member such as a nonwoven fabric filter may be charged with static electricity. In this case, the removal rate of the oil component is further increased.

In the third to fifth embodiments, the urethane foam block 50 is employed as the impingement member, but other members such as a crushed aluminum member may be employed.

In the third to fifth embodiments, a heating may be provided to heat the collected liquid in the collected liquid storage portion 254 to evaporate the water in the collected liquid. Heating of the heater is controlled by a non-illustrated thermostat. The heater may either heat the case 231 or directly heat the collected liquid in the collected liquid storage portion 254. The number of heaters may be changed as required.

Sixth Embodiment

Figure 27:
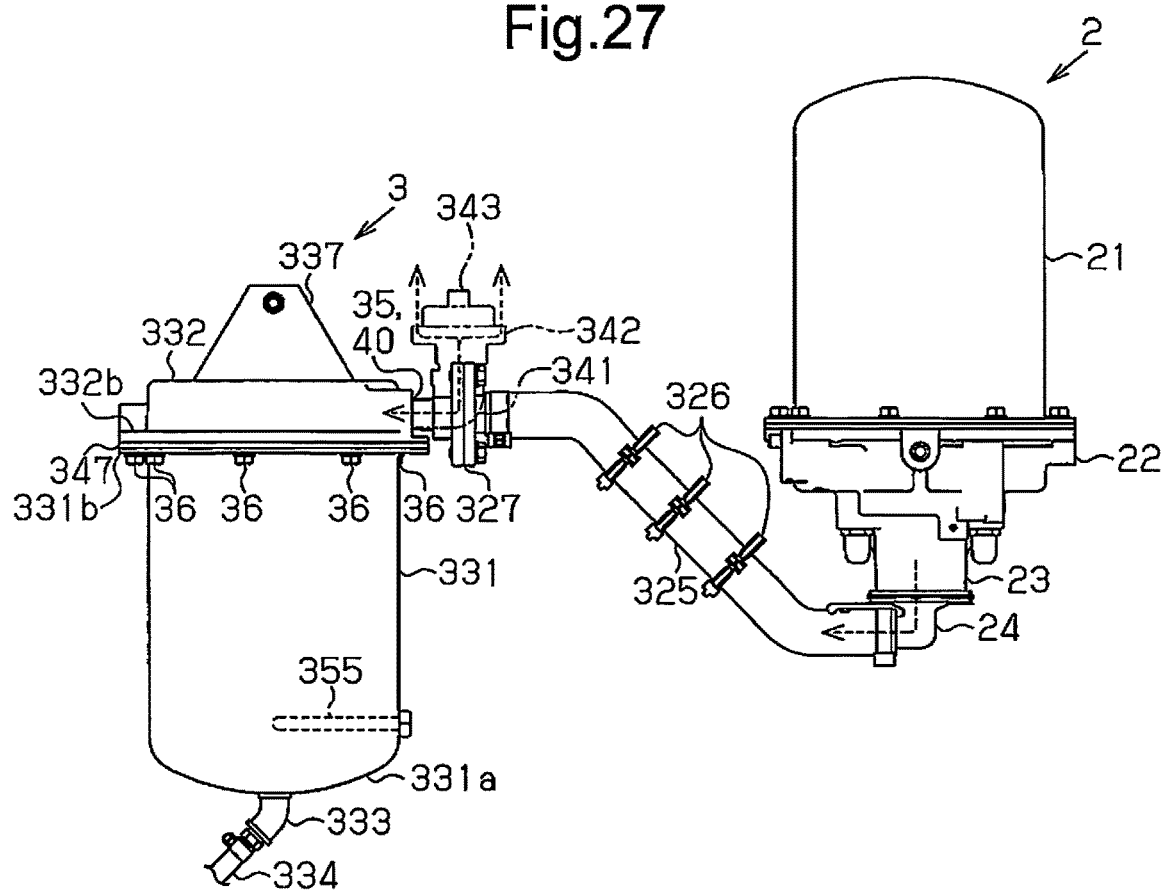
FIG. 27 is a diagram illustrating a connection state of an oil separator and an air dryer according to a sixth embodiment of the present invention.

As shown in FIG. 27, an air dryer 2 includes a cylindrical case 21 having a vertically upper end closed, and a support member 22, which closes the opening portion of the case 21 and supports the case 21. A purge air outlet 23, which discharges purge air during regeneration of a desiccant, is formed at the lower section of the support member 22. A purge air discharge cover 24, to which a connecting hose 325 is connected, is attached to the purge air outlet 23. The connecting hose 325 is connected to an oil separator 3. The connecting hose 325 is secured to, for example, the chassis of a vehicle with clips 326. An inlet (not shown), which introduces air compressed by the compressor 1, and an outlet (not shown), which discharges dried compressed air, are formed in the support member 22 of the air dryer 2.

The oil separator 3 includes a cylindrical housing having a closed end and extending in the vertical direction, which is a case 331 in this embodiment, and a lid 332, which closes the opening portion of the case 331. A drain outlet 333 for draining the collected liquid that has been stored is provided at a bottom portion 331a of the case 331. A drain hose 334, which is used when removing the collected liquid, is connected to the drain outlet 333. The lid 332 has an inlet 35 for introducing purge air from the air dryer 2 through the connecting hose 325, and an outlet 40 for discharging cleaned air from which oil has been separated. The inlet 35 and the outlet 40 are formed separately. The inlet 35 and the connecting hose 325 are connected to each other by a coupling member 327.

The inlet 35 of the oil separator 3 is located above the connection port of the purge air discharge cover 24 in the vertical direction. Thus, the overall height of the air dryer 2 and the oil separator 3 is reduced in the vertical direction.

An elbow member 341, which extends in the horizontal direction and bends vertically upward, is connected to the outlet 40 of the oil separator 3. A drip preventing member 342 and a cover 343 for preventing entry of foreign matter are attached on the distal end of the elbow member 341.

Figure 28:
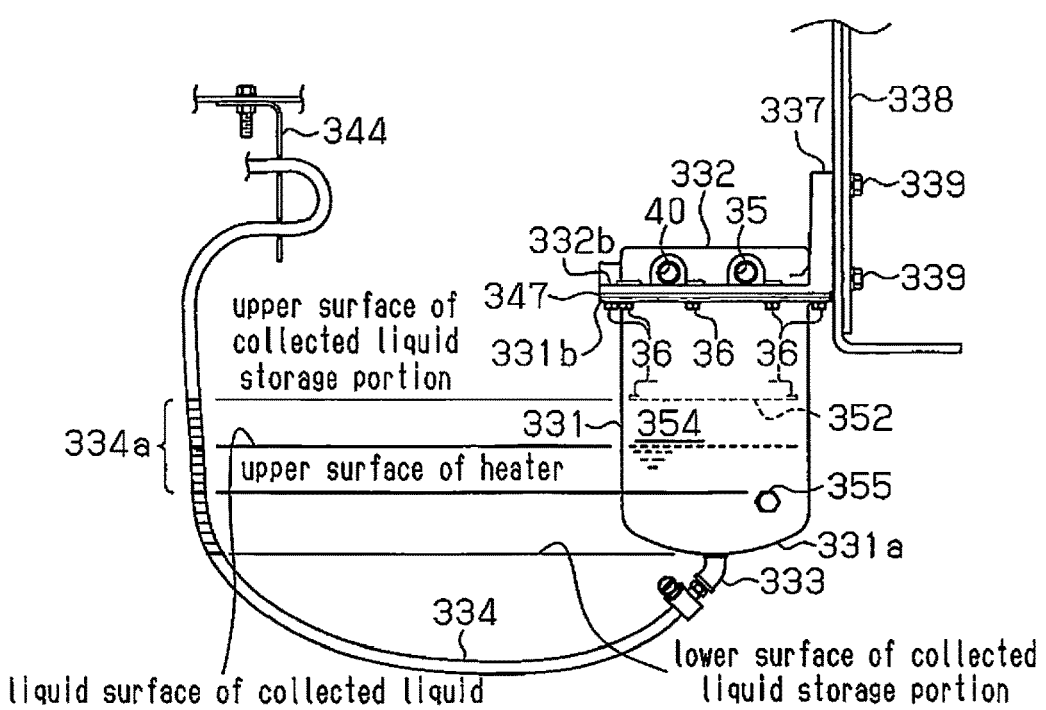
FIG. 28 is a diagram illustrating a mounting state of the oil separator.

As shown in FIG. 28, a mounting member 337 is formed integrally with the lid 332 of the oil separator 3 to extend upright from the lid 332. The mounting member 337 is secured to a chassis 338 with bolts 339.

The distal end of the drain hose 334 is hooked to a support plate 344, which is secured to, for example, the chassis 338 of the vehicle. The distal end of the drain hose 334 is located above the lid 332 of the oil separator 3.

Figure 29:
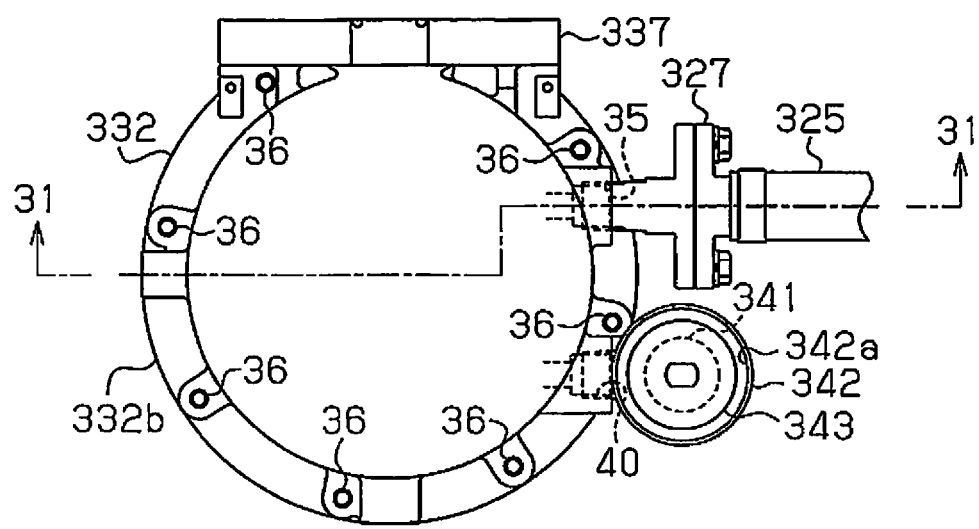
FIG. 29 is a top view illustrating the position of an inlet and an outlet of the oil separator.

As shown in FIG. 29, the lid 332 has the inlet 35 and the outlet 40, which are open in the same direction. The connecting hose 325 is connected to the inlet 35 via the coupling member 327. The elbow member 341 is connected to the outlet 40. That is, the coupling member 327 and the elbow member 341 are arranged next to each other.

Figure 30:
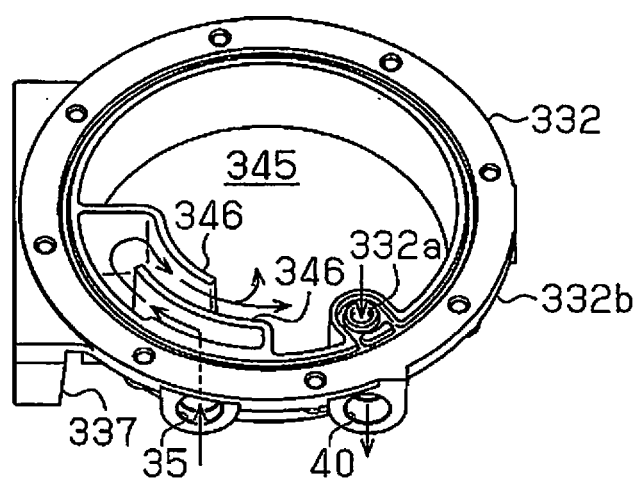
FIG. 30 is a bottom perspective view illustrating the inside of the lid of the oil separator.

As shown in FIG. 30, the lid 332 is a cylinder having a vertically upper end closed. Two baffle plates 346 extend from the inner wall of the lid 332 in the vicinity of the inlet 35 to be perpendicular to the flow direction of the purge air introduced through the inlet 35. The internal space of the lid 332 functions as a first expansion chamber 345, which expands the purge air introduced from the inlet 35. The lid 332 has a communication section 332a, which connects the inside of the case 331 to the outlet 40.

Figure 31:
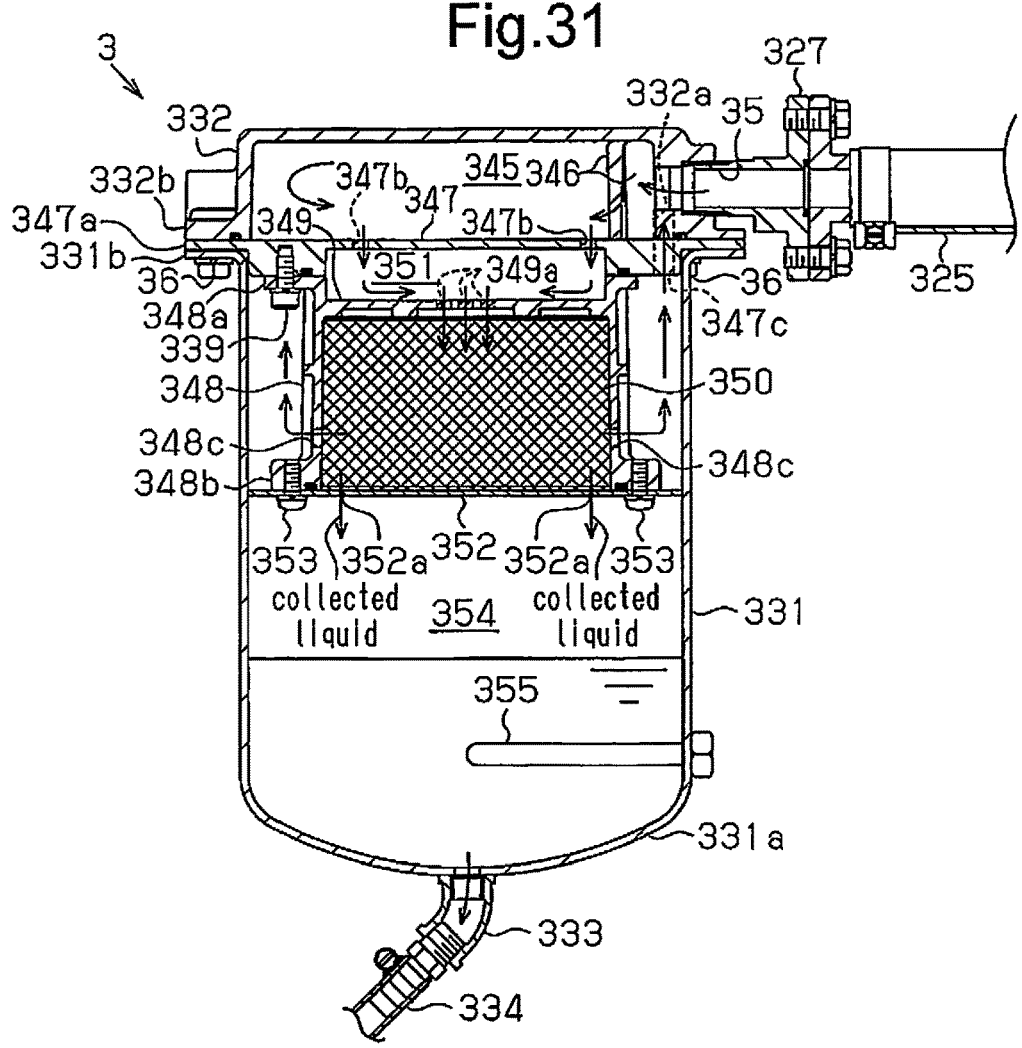
FIG. 31 is a cross-sectional view taken along line 31-31 in FIG. 29.

As shown in FIG. 31, a disk-like cover 347, which closes the case 331 and the opening portion of the lid 332, is provided between the case 331 and the lid 332. The cover 347 and the case 331 are fastened to the lid 332 with bolts 36. That is, the bolts 36 are fastened to threaded bores formed in a flange portion 332b provided on the lid 332. Furthermore, threaded portions of the bolts 36 extend through through-holes formed in a flange portion 331b provided on the case 331. The cover 347 has through-holes through which the threaded portions of the bolts 36 extend. Thus, the threaded portions of the bolts 36 are passed through the through-holes of the flange portion 331b of the case 331 and the through-holes of a flange portion 347a of the cover 347. The bolts 36 are then screwed to the threaded bores of the flange portion 332b of the lid 332 so that the lid 332, the cover 347, and the case 331 are fastened together. The cover 347 has a communication hole 347c, which connects the inside of the case 331 to the outlet 40.

The space formed by the lid 332 and the cover 347 functions as the first expansion chamber 345. A cylindrical accommodation member 348 with a vertically upper end closed is secured to the cover 347 with bolts 339. The accommodation member 348 accommodates a urethane foam block 350 such as a sponge block. The urethane foam block 350 functions as an impingement member. A flange portion 348a and a flange portion 348b are formed at an upper edge and a lower edge of the accommodation member 348, respectively. The bolts 339 extend through the flange portion 348a formed at the upper edge of the accommodation member 348 so that the accommodation member 348 is tightened to the cover 347. The space formed by the cover 347 and upper surface of the accommodation member 348 functions as a second expansion chamber 351. The cover 347 has through holes 347b, which connect the first expansion chamber 345 to the second expansion chamber 351. Through holes 349a are formed at the center portion of an upper base 349 of the accommodation member 348. The through holes 347b of the cover 347 and the through holes 349a of the upper base 349 of the accommodation member 348 are formed at positions that are not opposed to each another. The accommodation member 348 has through holes 348c formed at the lower end of the side face at intervals in the radial direction.

A disk-like support lid 352 is secured to the flange portion 348b, which is formed at the lower edge of the accommodation member 348, with screws 353. The support lid 352 supports the urethane foam block 350 accommodated in the accommodation member 348. The inner diameter of the support lid 352 is substantially the same as the inner diameter of the case 331. The support lid 352 has through holes 352a, which permit the oil and water removed by the urethane foam block 350 to drop. Thus, the lower section in the case 331 functions as a collected liquid storage portion 354. A heater 355 for evaporating water in the collected liquid by heating the stored collected liquid is arranged in the collected liquid storage portion 354. Heating of the heater 355 is controlled by a non-illustrated thermostat.

The drain hose 334 is transparent, and has a scale 334a corresponding to the volume of the collected liquid storage portion 354. For example, the scale 334a is provided corresponding to the upper surface of the collected liquid storage portion 354, the upper surface of the heater 355, and the lower surface of the collected liquid storage portion 354. The amount of the collected liquid in the collected liquid storage portion 354 is easily determined by visually checking the amount of the collected liquid in the drain hose 334.

Operation of the above described oil separator 3 will now be described.

As shown in FIG. 27, the purge air discharged from the air dryer 2 is introduced to the oil separator 3. The purge air contains oil and water.

As shown in FIG. 30, the purge air introduced through the inlet 35 strikes the baffle plates 346, is introduced into the oil separator 3 along the baffle plates 346, and expands in the first expansion chamber 345.

As shown in FIG. 31, the air expanded in the first expansion chamber 345 enters the second expansion chamber 351 via the through holes 347b formed in the cover 347. The air that has expanded in the second expansion chamber 351 enters the accommodation member 348 via the through holes 349a of the upper base 349 of the accommodation member 348. At this time, the oil and water that have struck the urethane foam block 350 are separated from the air. The liquid that contains the water and the oil trapped by the urethane foam block 350 moves through the urethane foam block 350. The liquid reaches the upper surface of the support lid 352, drops from the through holes 352a of the support lid 352 into a collected liquid storage portion 354, and is stored in the collected liquid storage portion 354. The collected liquid that is stored in the collected liquid storage portion 354 enters the drain hose 334 through the drain outlet 333. The collected liquid stored in the collected liquid storage portion 354 is heated by the heater 355. This evaporates the water in the collected liquid. Furthermore, the amount of the collected liquid stored in the collected liquid storage portion 354 can be determined by checking the amount of the collected liquid stored in the drain hose 334. When the amount of the collected liquid approaches the upper limit, the collected liquid is drained from the collected liquid storage portion 354 through the drain hose 334.

On the other hand, oil and water are separated from the air that has entered the accommodation member 348 from the through holes 349a of the upper base 349 of the accommodation member 348. The air then enters the case 331 from the through holes 348c on the side face of the accommodation member 348. The air that has entered the case 331 passes through the communication hole 347c of the cover 347 and the communication section 332a of the lid 332, and is discharged through the outlet 40. Thus, the air that has entered the case 331 hardly contacts the collected liquid in the collected liquid storage portion 354, and is discharged from the outlet 40. The air that is discharged from the outlet 40 is cleaned air that does not contain oil.

The sixth embodiment provides the following advantages in addition to the above described advantages.

(12) Generally, when oil stored in the housing of an oil separator is exposed to passing air, the oil can be absorbed in the passing air. As shown in FIG. 29, in the sixth embodiment, the inlet 35 and the outlet 40 are provided in the lid 332 at the upper section of the housing. Thus, the air introduced into the case 331 through the inlet 35 enters the accommodation member 348 from vertically above, and is discharged sideways of the accommodation member 348. Cleaned air is discharged through the outlet 40 via the communication section 332a. Also, the collected liquid storage portion 354 is located below the accommodation member 348. Thus, the air discharged from the sides of the accommodation member 348 is prevented from contacting the collected liquid stored in the collected liquid storage portion 354 located below the accommodation member 348. This prevents the passing air from absorbing oil.

(13) Since the baffle plates 346 are located in front of the inlet 35 in the internal space of the housing (lid 332), the velocity of the introduced air is reduced, and the air is scattered.

(14) Since the internal space of the housing is partitioned (divided) into the first expansion chamber 345 and the second expansion chamber 351, the air is repeatedly expanded so that the oil and the water contained in the air easily condense.

(15) The case 331 and the lid 332 are fastened together at the flange portions 331b, 332b in the vertical direction. Thus, the case 331 and the lid 332 are easily attached and easily separated.

(16) Since the heater 355 is provided in the collected liquid storage portion 354, the water is evaporated by heating the collected liquid.

(17) Since the drain hose 334, which drains the collected liquid, is connected to the lower section of the case 331, the collected liquid is easily drained.

(18) Since the drain hose 334 is transparent, the amount of the collected liquid in the drain hose 334 can be determined. Also, since the scale 334a corresponding to the volume of the collected liquid storage portion 354 is provided on the drain hose 334, the amount of the collected liquid in the collected liquid storage portion 354 is easily determined based on the amount of the collected liquid in the drain hose 334.

Seventh Embodiment

An oil separator according to a seventh embodiment will now be described with reference to FIGS. 32 to 35. The oil separator of the seventh embodiment is substantially identical to the oil separator of the sixth embodiment except that a discharge hose is connected to the outlet 40 and that the connecting hose 325 connected to the inlet 35 and the purge air outlet 23 of the air dryer 2 are connected to each other by a separate type connecting member. Differences from the sixth embodiment will mainly be discussed below.

Figure 32:
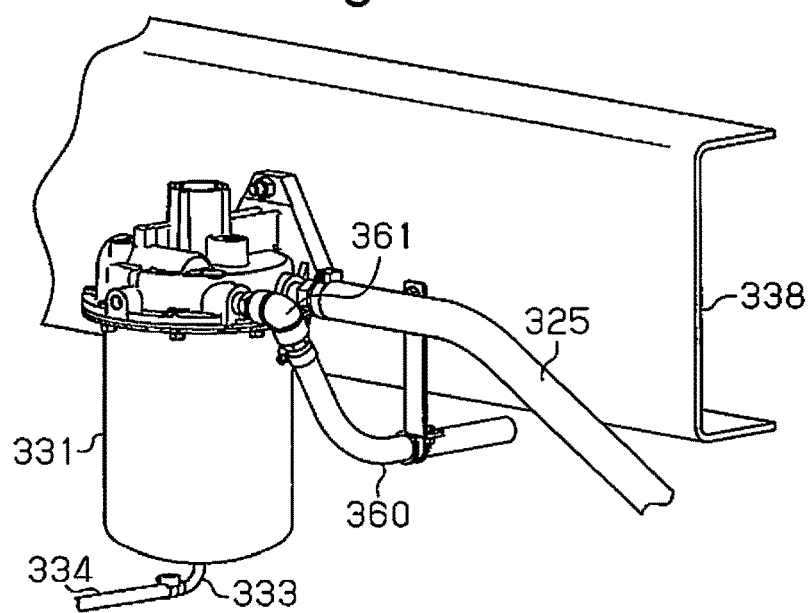
FIG. 32 is a vertical cross-sectional view illustrating a mounting state of an oil separator according to a seventh embodiment of the present invention.
Figure 33:
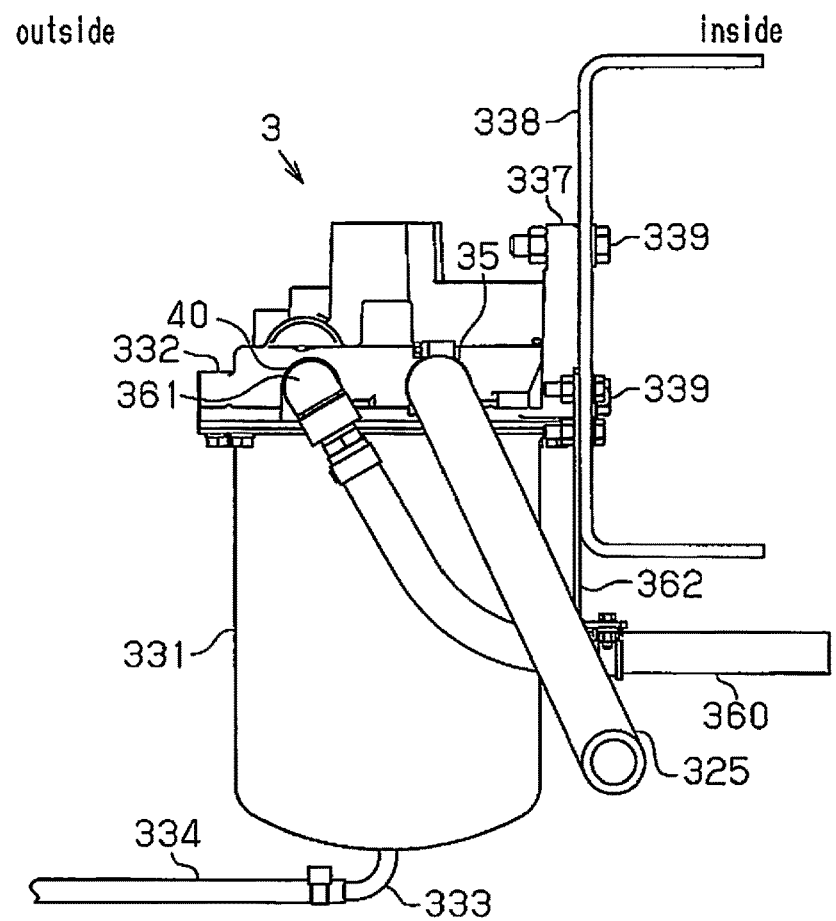
FIG. 33 is a diagram illustrating a mounting state of the oil separator.

As shown in FIGS. 32 and 33, the oil separator 3 is fixed to a chassis 338 via a mounting member 337. The oil separator 3 is located closer to the outside of the vehicle with respect to the chassis 338. The inlet 35 of the oil separator 3 is connected to a first end of the connecting hose 325, which is connected to the purge air outlet 23 of the air dryer 2. The outlet 40 of the oil separator 3 is connected to a first end, which is a connecting end of a discharge hose 360, via an L-shaped connecting member 361. The discharge hose 360 extends below the chassis 338 from the connecting member 361. The discharge hose 360 is fixed by a securing member 362, which is fixed to the chassis 338. The discharge hose 360 functions as an exhaust noise reducing member.

Figure 34:
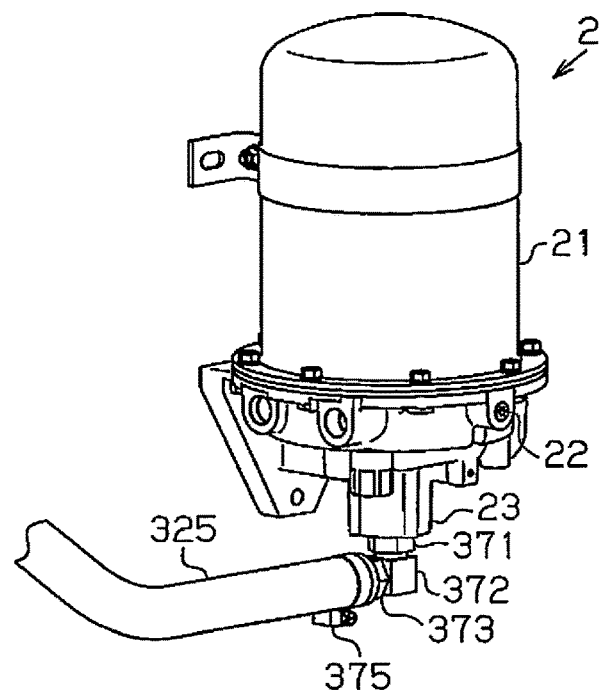
FIG. 34 is a perspective view illustrating a connection state of a connecting hose connected to the outlet of the air dryer.
Figure 35:
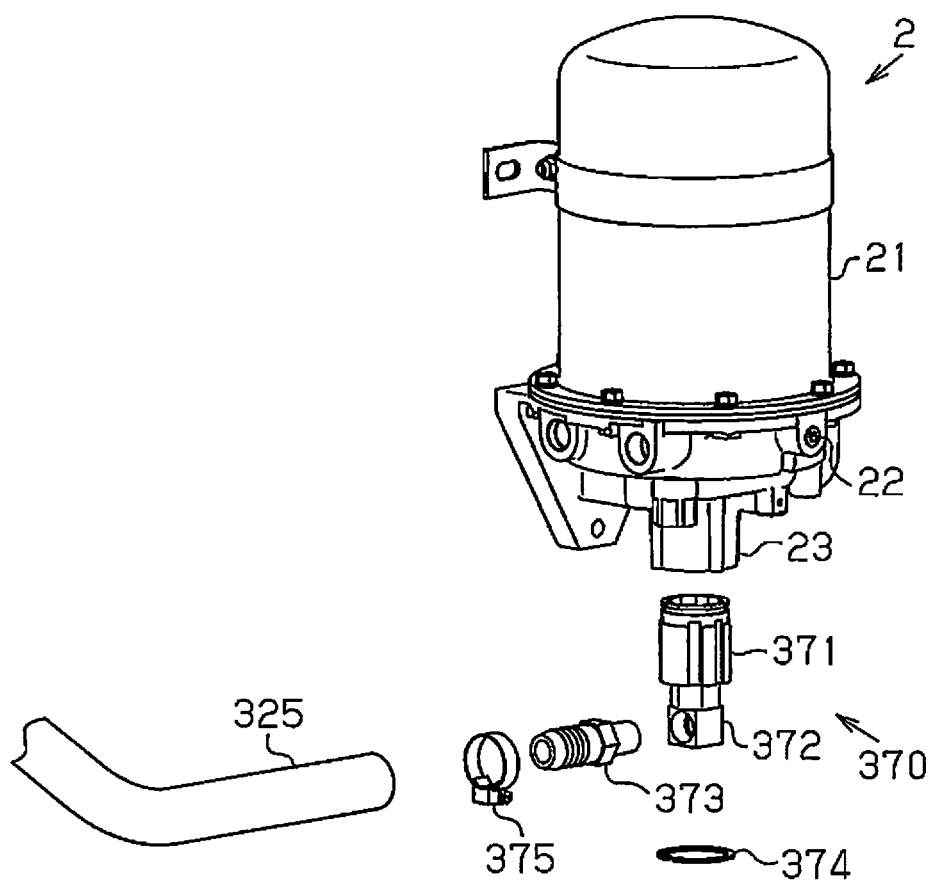
FIG. 35 is a perspective view illustrating a connection structure of a connecting hose connected to the outlet of the air dryer.

As shown in FIGS. 34 and 35, a second end of the connecting hose 325 is connected to the purge air outlet 23 of the air dryer 2 via a dryer connecting member 370. The dryer connecting member 370 includes a cylindrical fitting member 371, a joint member 372, and a nipple 373. The fitting member 371 is fitted to the purge air outlet 23 and fixed to the air dryer 2 with a retaining ring 374. The clearance between the air dryer 2 and the fitting member 371 is sealed by an O-ring (not shown). The joint member 372 is inserted into and connected to the fitting member 371. The nipple 373 is inserted into and connected to the joint member 372. The joint member 372 has an L-shaped through hole. The fitting member 371 communicates with the nipple 373 via the through hole. The second end of the connecting hose 325 is attached to the nipple 373 and is secured by a hose band 375.

Operation of the above described oil separator 3 will now be described.

The purge air discharged by the air dryer 2 is introduced into the connecting hose 325 via the purge air outlet 23 and the dryer connecting member 370. At this time, the purge air flows through the fitting member 371 of the dryer connecting member 370 and the nipple 373 of the joint member 372 to be introduced into the connecting hose 325 and to the inlet 35 of the oil separator 3.

The exhaust from the outlet 40 of the oil separator 3 is guided toward the center of the vehicle by the discharge hose 360, which is connected to the outlet 40, and is discharged from the second end, which is an exhaust end of the discharge hose 360. Thus, the exhaust end of the discharge hose 360 is separated away from the outer side of the vehicle, which reduces the exhaust noise.

The seventh embodiment provides the following advantage in addition to the advantages (12) to (18) of the sixth embodiment.

(19) The discharge hose 360, which is an exhaust noise reducing member connected to the outlet 40, reduces the exhaust noise of the outlet 40.

Eighth Embodiment

An oil separator according to an eighth embodiment will now be described with reference to FIGS. 36 and 37. The oil separator of the eighth embodiment is substantially identical to the oil separator of the sixth embodiment except that a silencer is connected to the outlet 40. Differences from the sixth embodiment will mainly be discussed below.

Figure 36:
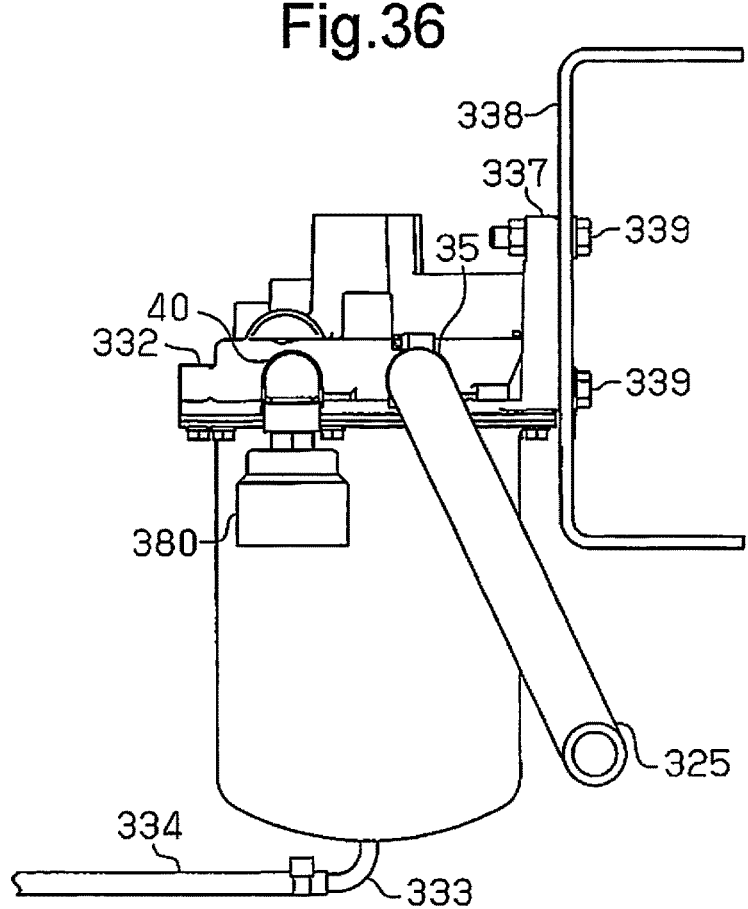
FIG. 36 is a diagram illustrating the structure an oil separator according to an eighth embodiment of the present invention.

As shown in FIG. 36, a cylindrical silencer 380 is connected to the outlet 40 of the oil separator 3 via an L-shaped connecting member 361. The silencer 380 is fixed by the connecting member 361. The silencer 380 functions as an exhaust noise reducing member.

Figure 37:
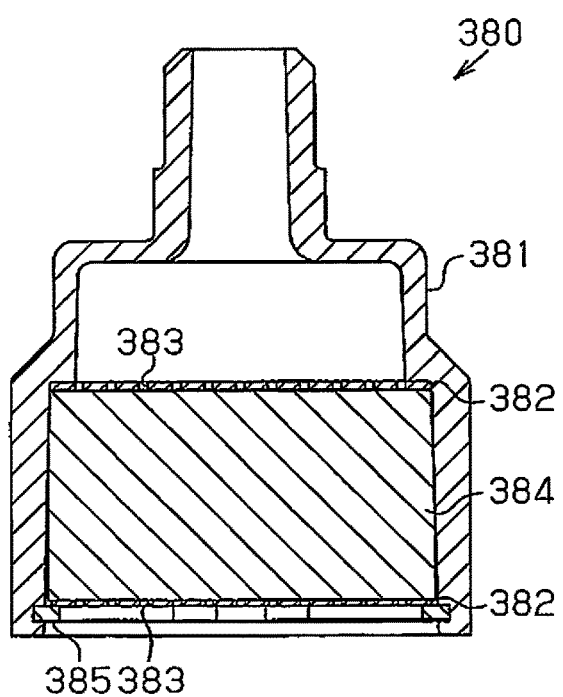
FIG. 37 is a cross-sectional view illustrating an exhaust noise reducing member attached to the outlet of the oil separator.

As shown in FIG. 37, the silencer 380 includes a cylindrical case 381 with a step. The case 381 accommodates a muffling member. The silencer 380 incorporate two support plates 382, which have through holes 383. Crushed aluminum 384, which functions as the muffling member, is accommodated between the support plates 382. The lower support plate 382 is fixed by a retaining ring 385.

Operation of the above described oil separator 3 will now be described.

The exhaust discharged from the outlet 40 of the oil separator 3 is discharged to the outside after flowing through the silencer 380, which is connected to the outlet 40. This structure reduces (muffles) the exhaust noise from the outlet 40.

The eighth embodiment provides the following advantage in addition to the advantages (12) to (18) of the sixth embodiment.

(20) The silencer 380, which is an exhaust noise reducing member connected to the outlet 40, reduces the exhaust noise of the outlet 40.

The above described sixth to eighth embodiments may be modified as follows.

In the sixth to eighth embodiments, the scale 334a is provided on the drain hose 334, but the scale 334a may be omitted from the drain hose 334.

In the sixth to eighth embodiments, the drain hose 334 is connected to the drain outlet 333 of the case 331. However, the drain hose 334 may be omitted, and the collected liquid may be directly drained from the drain outlet 333.

In the sixth to eighth embodiments, the first expansion chamber 345 and the second expansion chamber 351 are provided in the oil separator 3. However, at least one of the first expansion chamber 345 and the second expansion chamber 351 may be provided.

In the sixth to eighth embodiments, a member such as a nonwoven fabric filter may be provided upstream or downstream of the urethane foam block 350, or in the expansion chambers 345, 351. In this case, the removal rate of the oil component is increased. Furthermore, a member such as a nonwoven fabric filter may be charged with static electricity. In this case, the removal rate of the oil component is further increased.

In the sixth to eighth embodiments, the urethane foam block 350 is employed as the impingement member, but other members such as a crushed aluminum member may be employed.

In the sixth to eighth embodiments, the heater 355 heats the collected liquid storage portion 354. However, the heater 355 may directly heat the collected liquid stored in the collected liquid storage portion 354. In this case, a thermostat is desirably located on the inner wall of the case 331 to perform accurate temperature control. Since this structure increases the heat transfer from the heater 355 to the collected liquid, the collected liquid is efficiently heated as compared to the case in which the collected liquid is indirectly heated.

The number of heaters 355 may be changed as required.

In the sixth to eighth embodiments, the oil separator 3 is provided in the exhaust system of the air dryer 2, which is downstream of the compressor 1 of the air system. However, the oil separator 3 may be provided downstream of the compressor 1 of the air system and upstream of the air dryer 2. In this case, oil is separated from air containing lubricant for the compressor 1, and cleaned air is supplied to the air dryer 2. Thus, the desiccant in the air dryer 2 is prevented from being deteriorated due to the oil.

What is claimed is:

1. A system comprising:
   a compressor that supplies compressed air;
   an air dryer that dries the compressed air supplied from the compressor and supplies dried compressed air, the air dryer comprising a supplying line that supplies the dried compressed air and an exhaust line that discharges purge air; and
   an oil separator connected to the exhaust line, the oil separator comprising:
      a housing including an inlet for introducing purge air from an air dryer and an outlet for discharging cleaned air, and
      a plurality of expansion chambers arranged next to one another in a vertical direction, a first expansion chamber of the plurality of expansion chambers comprising a vertically-extending wall portion defining a side face, wherein a through hole is formed at the side face of the first expansion chamber, and the inlet of the housing is connected to the through hole, wherein
   the oil separator is configured to cause the purge air to flow into the housing form the inlet to separate oil from the purge air, thereby collecting liquid containing oil, and to discharge cleaned air from the outlet via an expansion chamber of the plurality of expansion chambers that is different from the first expansion chamber,
   the oil separator further comprises:
   a collected liquid storage portion that is formed in a lower part of the housing and stores the collected liquid; and
   a drain outlet formed in the lower part of the housing for draining the collected liquid; and wherein the expansion chamber of the plurality of expansion chambers that is different from the first expansion chamber is directly connected to, and communicates with, the collected liquid storage portion.

2. The system according to claim 1, wherein
   the oil separator further comprises:
      an impingement member,
   the oil separator is further configured to cause the flowed purge air to strike the impingement member to separate oil from the purge air, and
   the housing further includes a lid attachable to the housing, and the inlet and the outlet are provided with the lid.

3. The system according to claim 2, wherein the oil separator further comprises a pressurizing device connecting portion to which a pressurizing device for pressurizing the inside of the housing is connected.

4. The system according to claim 1, wherein
the oil separator further comprises:
a drain hose connected to the drain outlet; and
a securing member to which a distal end of the drain hose is detachably attached, and
the securing member closes the distal end of the drain hose at least during unloading operation of the air dryer.

5. The system according to claim 4, wherein the securing member is attached to the distal end of the drain hose such that the securing member faces vertically upward.

6. The system according to claim 4, wherein
the securing member includes a discharge valve, and
the discharge valve is closed during the unloading operation of the air dryer and is opened at times other than such operation.

7. The system according to claim 4, wherein the securing member includes a constriction member that restricts flow of the collected liquid.

8. The system according to claim 1, wherein the oil separator further comprises a drain hose connected to the drain outlet, and the drain hose is transparent and is provided with a scale corresponding to the volume of the collected liquid storage portion.

9. A system comprising:
a compressor that supplies compressed air;
an air dryer that dries the compressed air supplied from the compressor and supplies dried compressed air, the air dryer comprising a supplying line that supplies the dried compressed air and an exhaust line that discharges purge air; and
an oil separator connected to the exhaust line, the oil separator comprising:
a housing including an inlet for introducing the purge air from the air dryer and an outlet for discharging cleaned air;
a plurality of expansion chambers arranged next to one another in a vertical direction, a first expansion chamber of the plurality of expansion chambers comprising a vertically-extending wall portion defining a side face, wherein a through hole is formed at the side face of the first expansion chamber, and the inlet of the housing is connected to the through hole;
a communication section that connects the inside of the housing and the outlet to each other; and
a collected liquid storage portion located below the plurality of expansion chambers, wherein
one or more of the plurality of expansion chambers comprise an impingement member,
the oil separator is configured to introduce the purge air into the housing through the inlet, and cause the purge air to strike the impingement member to separate oil from the introduced purge air, thereby collecting the oil and to discharge cleaned air from the outlet via an expansion chamber of the plurality of expansion chambers that is different from the first expansion chamber,
the inlet and the outlet are located in an upper section of the housing, and
each of the one or more of the plurality of expansion chambers separates oil from the introduced purge air and discharges the separated oil downward; and
wherein the expansion chamber of the plurality of expansion chambers that is different from the first expansion chamber is directly connected to, and communicates with, the collected liquid storage portion.

10. The system according to claim 9, wherein a baffle plate is provided in the housing at a position in front of the inlet, the baffle plate obstructing the introduced purge air from flowing straight ahead.

11. The system according to claim 9, wherein,
the housing includes a case and a lid, and
the case and the lid each have a flange and are fastened together at the flanges in the vertical direction.

12. The system according to claim 9, wherein the collected liquid storage portion includes a heater for evaporating water by heating collected liquid.

13. The system according to claim 9, wherein a hose for draining the collected liquid is connected to a lower section of the housing.

14. The system according to claim 13, wherein the hose is transparent and is provided with a scale corresponding to the volume of the collected liquid storage portion.

15. The system according to claim 9, wherein an exhaust noise reducing member is connected to the outlet to reduce exhaust noise from the outlet.

16. A system comprising:
a compressor that supplies compressed air;
an air dryer that dries the compressed air supplied from the compressor and supplies dried compressed air, the air dryer comprising a supplying line that supplies the dried compressed air and an exhaust line that discharges purge air; and
an oil separator connected to the exhaust line, the oil separator comprising:
a lid including an inlet for introducing purge air from the air dryer and an outlet for discharging cleaned air;
a plurality of expansion chambers arranged next to one another in a vertical direction, a first expansion chamber of the plurality of expansion chambers comprising a vertically-extending wall portion defining a side face, wherein a through hole is formed at the side face of the first expansion chamber, and the inlet of the housing is connected to the through hole;
a housing attachable to the lid; and
an attaching and detaching mechanism for allowing the lid to be attached to and detached from the housing, wherein
the oil separator is configured to cause the purge air to flow into the housing and strike an impingement member to separate oil from the purge air, thereby collecting liquid containing oil, and to discharge cleaned air from the outlet via an expansion chamber of the plurality of expansion chambers that is different from the first expansion chamber, and
a through hole, which permits the purge air introduced through the inlet to flow vertically downward, is formed between the expansion chambers; and
wherein the expansion chamber of the plurality of expansion chambers that is different from the first expansion chamber is directly connected to, and communicates with, a collected liquid storage portion.

17. The system according to claim 16, wherein the inlet and the outlet are each provided on a side of the lid that faces in the horizontal direction.

18. The system according to claim 16, further comprising a heating device, which heats the collected liquid stored in the housing,
wherein an insertion hole for inserting the heating device into the housing is formed in a lower part of the housing.

19. The system according to claim 16, further comprising a heating device, which heats the housing,
   wherein an accommodation portion for accommodating the heating device is provided in a lower part of the housing.

* * * * *